(12) United States Patent
Lee et al.

(10) Patent No.: US 12,369,170 B2
(45) Date of Patent: Jul. 22, 2025

(54) METHOD AND DEVICE FOR EFFICIENTLY SUPPORTING NR V2X COMMUNICATION

(71) Applicant: LG ELECTRONICS INC., Seoul (KR)

(72) Inventors: Seungmin Lee, Seoul (KR); Daesung Hwang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 344 days.

(21) Appl. No.: 18/013,860

(22) PCT Filed: Aug. 17, 2021

(86) PCT No.: PCT/KR2021/010875
§ 371 (c)(1),
(2) Date: Dec. 29, 2022

(87) PCT Pub. No.: WO2022/039469
PCT Pub. Date: Feb. 24, 2022

(65) Prior Publication Data
US 2023/0300856 A1    Sep. 21, 2023

Related U.S. Application Data

(60) Provisional application No. 63/066,797, filed on Aug. 17, 2020.

(51) Int. Cl.
*H04W 72/25* (2023.01)
*H04L 1/08* (2006.01)
(Continued)

(52) U.S. Cl.
CPC .............. *H04W 72/25* (2023.01); *H04L 1/08* (2013.01); *H04L 1/1812* (2013.01); *H04L 5/1469* (2013.01); *H04W 72/1263* (2013.01)

(58) Field of Classification Search
CPC ....... H04L 1/08; H04L 1/1614; H04L 1/1671; H04L 1/1812; H04L 1/1893;
(Continued)

(56) References Cited

U.S. PATENT DOCUMENTS

2019/0182827 A1* 6/2019 Wang .................... H04W 72/20
2020/0106566 A1    4/2020 Yeo et al.
(Continued)

FOREIGN PATENT DOCUMENTS

| WO | 2020/033089 A1 | 2/2020 |
| WO | 2020/063611 A1 | 4/2020 |
| WO | 2020153821 A1 | 7/2020 |

OTHER PUBLICATIONS

"Remaining details of physical layer procedures for sideline", Huawei, HiSilicon, 3GPP TSG RAN WG1 Meeting #101-e, E-meeting, May 25-Jun. 5, 2020, R1-2003498, 17 pages.

*Primary Examiner* — Awet Haile
(74) *Attorney, Agent, or Firm* — BRYAN CAVE LEIGHTON PAISNER LLP

(57) ABSTRACT

A method for performing wireless communication by a first device is proposed. The method may comprise the steps of: transmitting first sidelink control information (SCI) related to initial transmission, to a second device through a first physical sidelink control channel (PSCCH), wherein the first SCI related to the initial transmission includes scheduling information of second SCI related to the initial transmission, which is transmitted through a first physical sidelink shared channel (PSSCH) related to the first PSCCH; transmitting, to the second device, a medium access control protocol data unit (MAC PDU) and the second SCI related to the initial transmission through the first PSSCH, wherein the second SCI related to the initial transmission includes location information of the first device, which is related to the initial transmission; transmitting first SCI related to retransmis-
(Continued)

sion, to the second device through a second PSCCH, wherein the first SCI related to the retransmission includes scheduling information of second SCI related to the retransmission, which is transmitted through a second PSSCH related to the second PSCCH; and transmitting, to the second device, the MAC PDU and the second SCI related to the retransmission through the second PSSCH, wherein the second SCI related to the retransmission includes the location information of the first device, which is related to the initial transmission.

20 Claims, 21 Drawing Sheets

(51) Int. Cl.
  *H04L 1/1812* (2023.01)
  *H04L 5/14* (2006.01)
  *H04W 72/1263* (2023.01)

(58) Field of Classification Search
  CPC ........... H04L 1/1896; H04L 2001/0093; H04L 5/1469; H04L 1/1864; H04W 28/0875; H04W 4/023; H04W 4/40; H04W 72/1263; H04W 72/25; H04W 80/02; H04W 92/18; H04W 64/00
  See application file for complete search history.

(56) References Cited

U.S. PATENT DOCUMENTS

| | | |
|---|---|---|
| 2020/0178039 A1* | 6/2020 | Lee .................. H04L 1/1819 |
| 2020/0260231 A1 | 8/2020 | Ganesan et al. |
| 2021/0160846 A1* | 5/2021 | Wu .................. H04L 1/189 |
| 2021/0321396 A1* | 10/2021 | Li .................... H04W 72/23 |
| 2022/0053480 A1* | 2/2022 | Wang ............... H04L 5/0094 |
| 2023/0246747 A1* | 8/2023 | Son .................. H04L 1/1896 370/329 |
| 2023/0283414 A1* | 9/2023 | Hou .................. H04W 4/46 370/329 |

* cited by examiner

FIG. 10
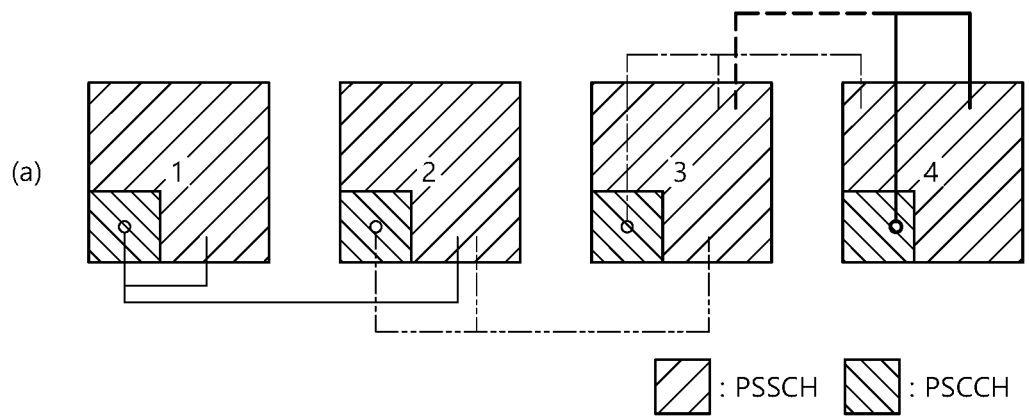
(a)
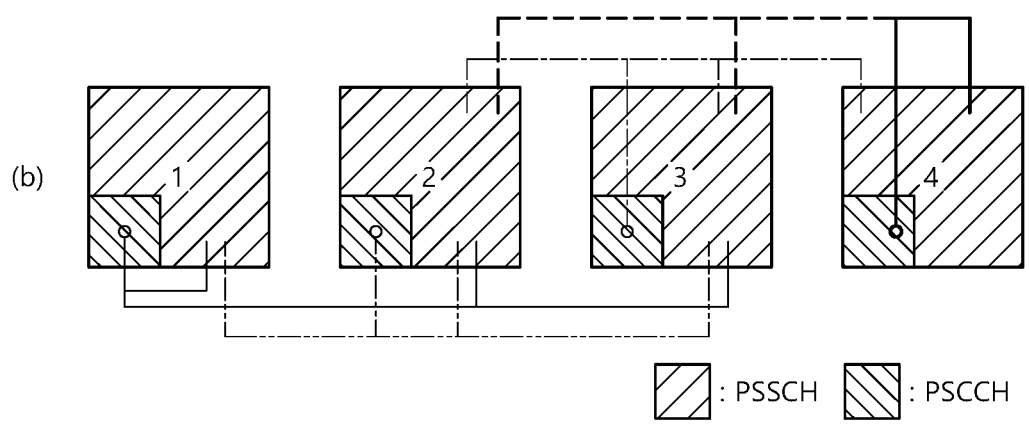
(b)
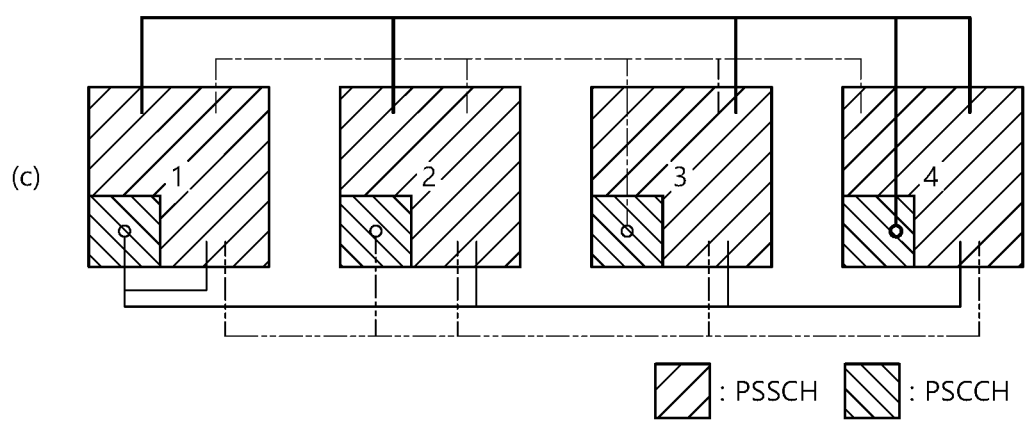
(c)

METHOD AND DEVICE FOR EFFICIENTLY SUPPORTING NR V2X COMMUNICATION

CROSS-REFERENCE TO RELATED APPLICATIONS

This application is the National Stage filing under 35 U.S.C. 371 of International Application No. PCT/KR2021/010875, filed on Aug. 17, 2021, which claims the benefit of U.S. Provisional Patent Application No. 63/066,797, filed on Aug. 17, 2020, the contents of which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, in sidelink communication, when a transmitting UE initially transmits SL data to a receiving UE, the transmitting UE may transmit location information of the transmitting UE to the receiving UE. Thereafter, for example, when the transmitting UE retransmits SL data to the receiving UE, if the location of the transmitting UE is changed, it may be a problem which location information the transmitting UE transmits to the receiving UE.

In an embodiment, proposed is a method for performing wireless communication by a first device. The method may comprise: transmitting, to a second device, first sidelink control information (SCI) related to initial transmission through a first physical sidelink control channel (PSCCH), wherein the first SCI related to the initial transmission includes scheduling information of second SCI related to the initial transmission transmitted through a first physical sidelink shared channel (PSSCH) related to the first PSCCH; transmitting, to the second device, the second SCI related to the initial transmission and a medium access control (MAC) protocol data unit (PDU) through the first PSSCH, wherein the second SCI related to the initial transmission includes location information related to the initial transmission of the first device; transmitting, to the second device, first SCI related to retransmission through a second PSCCH, wherein the first SCI related to the retransmission includes scheduling information of second SCI related to the retransmission transmitted through a second PSSCH related to the second PSCCH; and transmitting, to the second device, the second SCI related to the retransmission and the MAC PDU through the second PSSCH, wherein the second SCI related to the retransmission includes the location information related to the initial transmission of the first device.

In an embodiment, proposed is a first device adapted to perform wireless communication. The first device may comprise: one or more memories storing instructions; one or more transceivers; and one or more processors connected to the one or more memories and the one or more transceivers, wherein the one or more processors execute the instructions to: transmit, to a second device, first sidelink control information (SCI) related to initial transmission through a first physical sidelink control channel (PSCCH), wherein the first SCI related to the initial transmission includes scheduling information of second SCI related to the initial transmission transmitted through a first physical sidelink shared channel (PSSCH) related to the first PSCCH; transmit, to the second device, the second SCI related to the initial transmission and a medium access control (MAC) protocol data unit (PDU) through the first PSSCH, wherein the second SCI related to the initial transmission includes location information related to the initial transmission of the first device; transmit, to the second device, first SCI related to retransmission through a second PSCCH, wherein the first SCI related to the retransmission includes scheduling information of second SCI related to the retransmission transmitted through a second PSSCH related to the second PSCCH; and transmit, to the second device, the second SCI related to the retransmission and the MAC PDU through the second PSSCH, wherein the second SCI related to the retransmission includes the location information related to the initial transmission of the first device.

The user equipment (UE) can efficiently perform SL communication.

BRIEF DESCRIPTION OF THE DRAWINGS

FIG. 10(a), FIG. 10(b) and FIG. 10(c) show a method in which a UE that has reserved transmission resource(s) informs another UE of the transmission resource(s), based on an embodiment of the present disclosure.

BRIEF DESCRIPTION OF THE DRAWINGS

Figure 1:
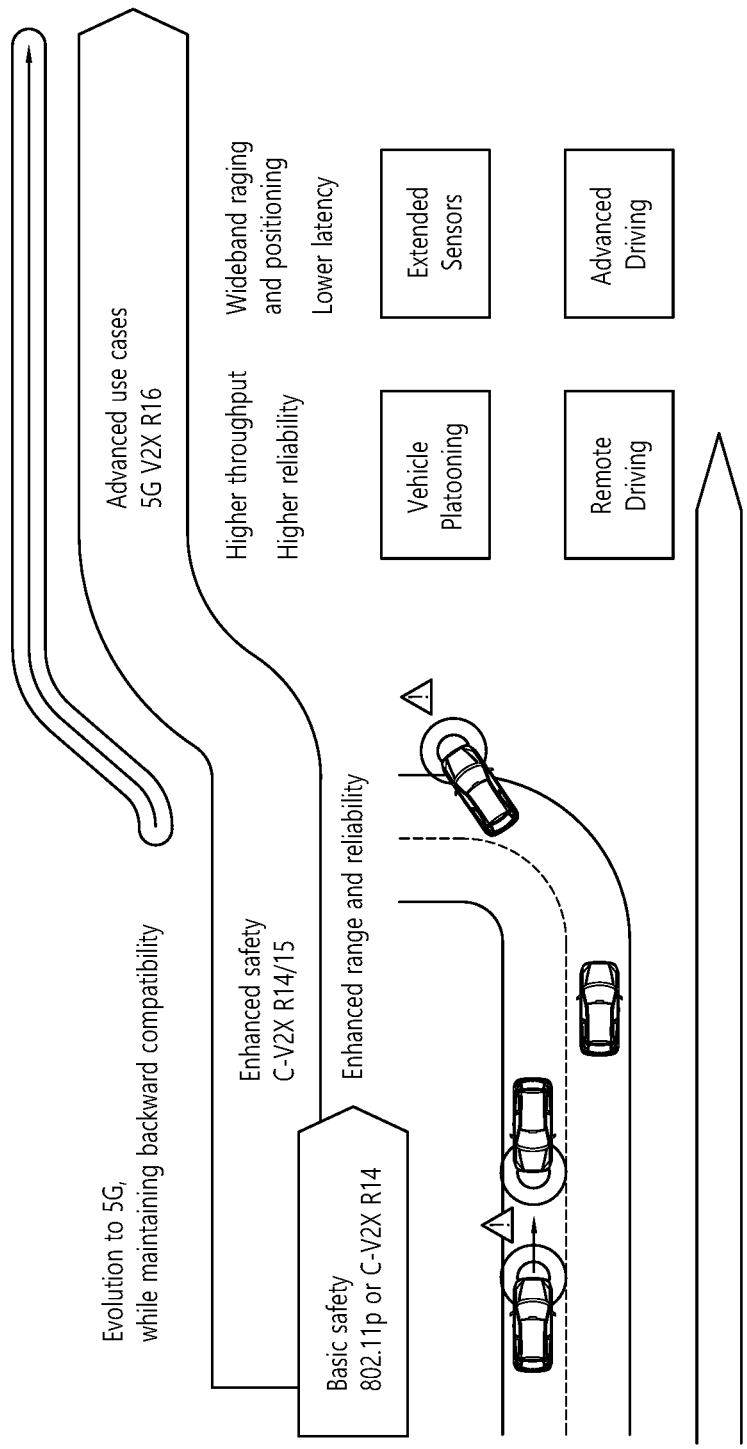
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
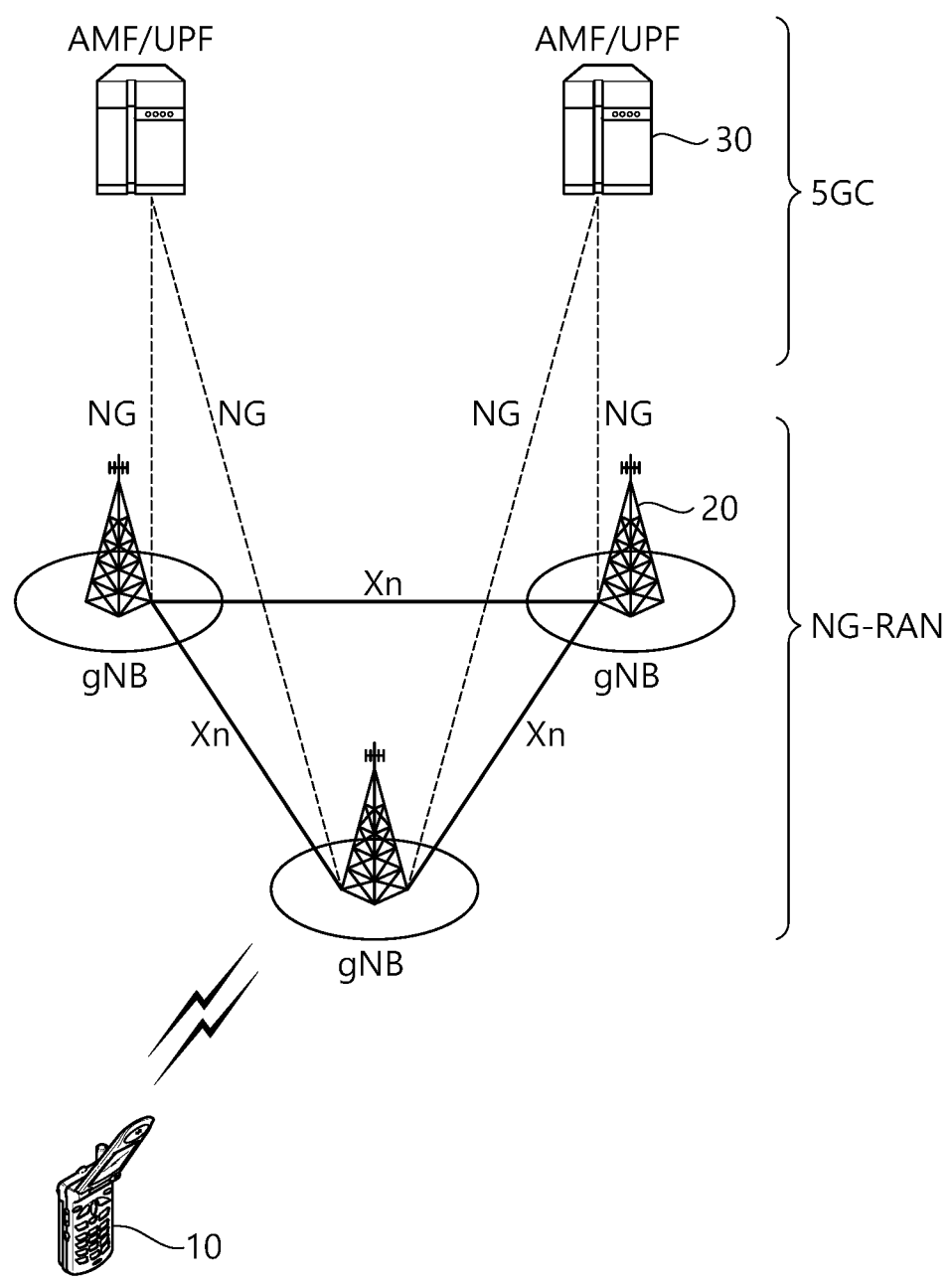
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
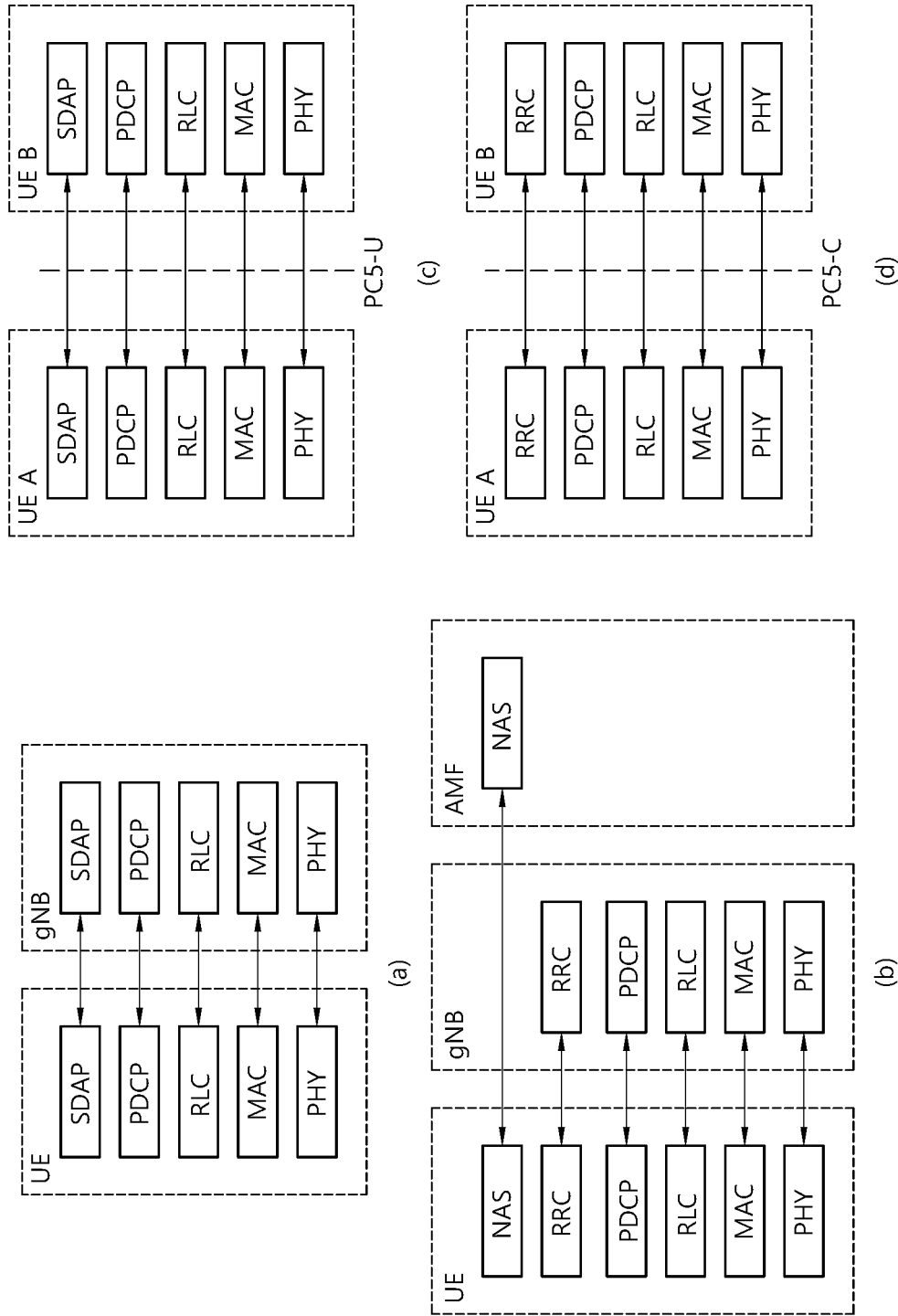
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
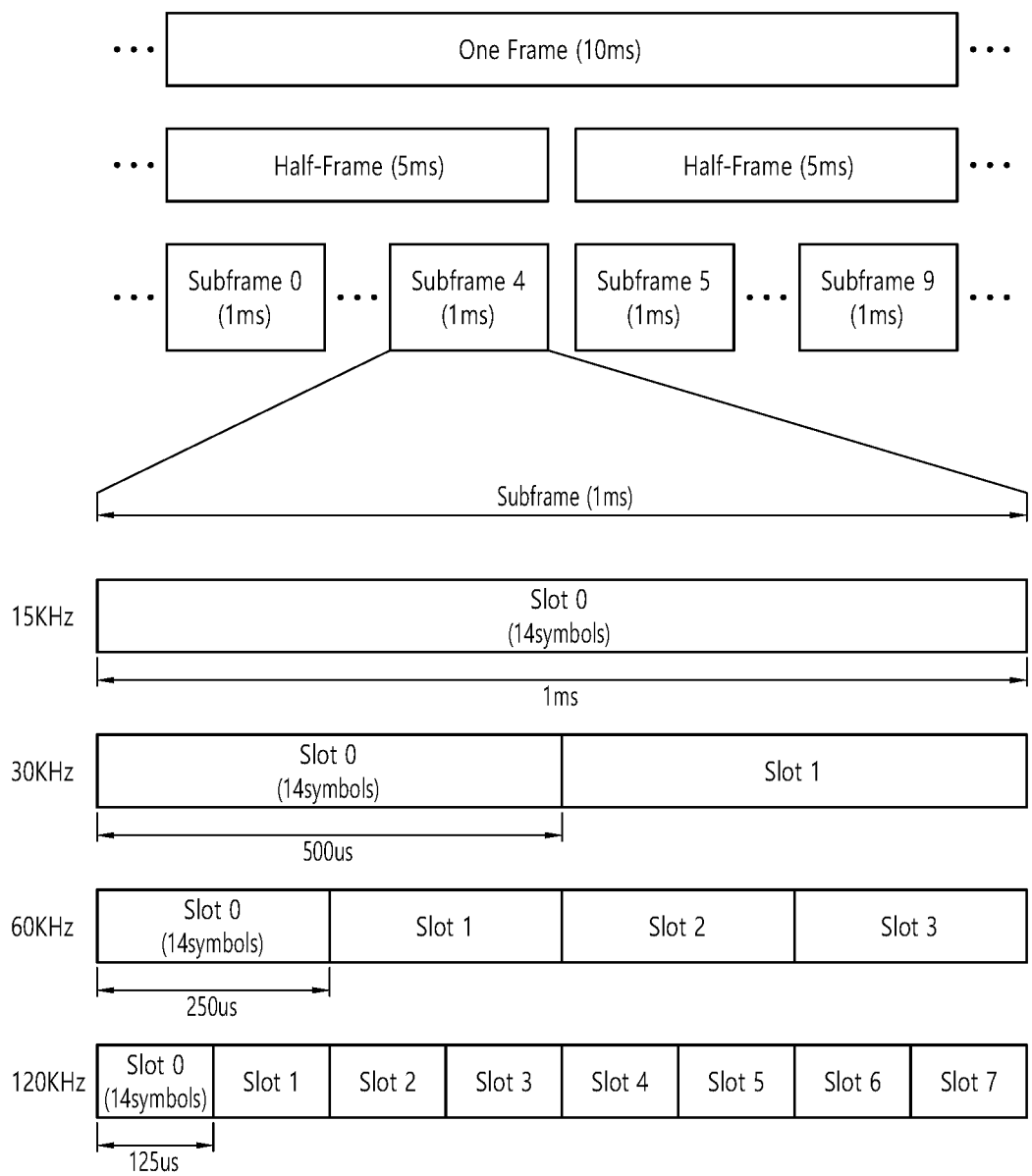
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
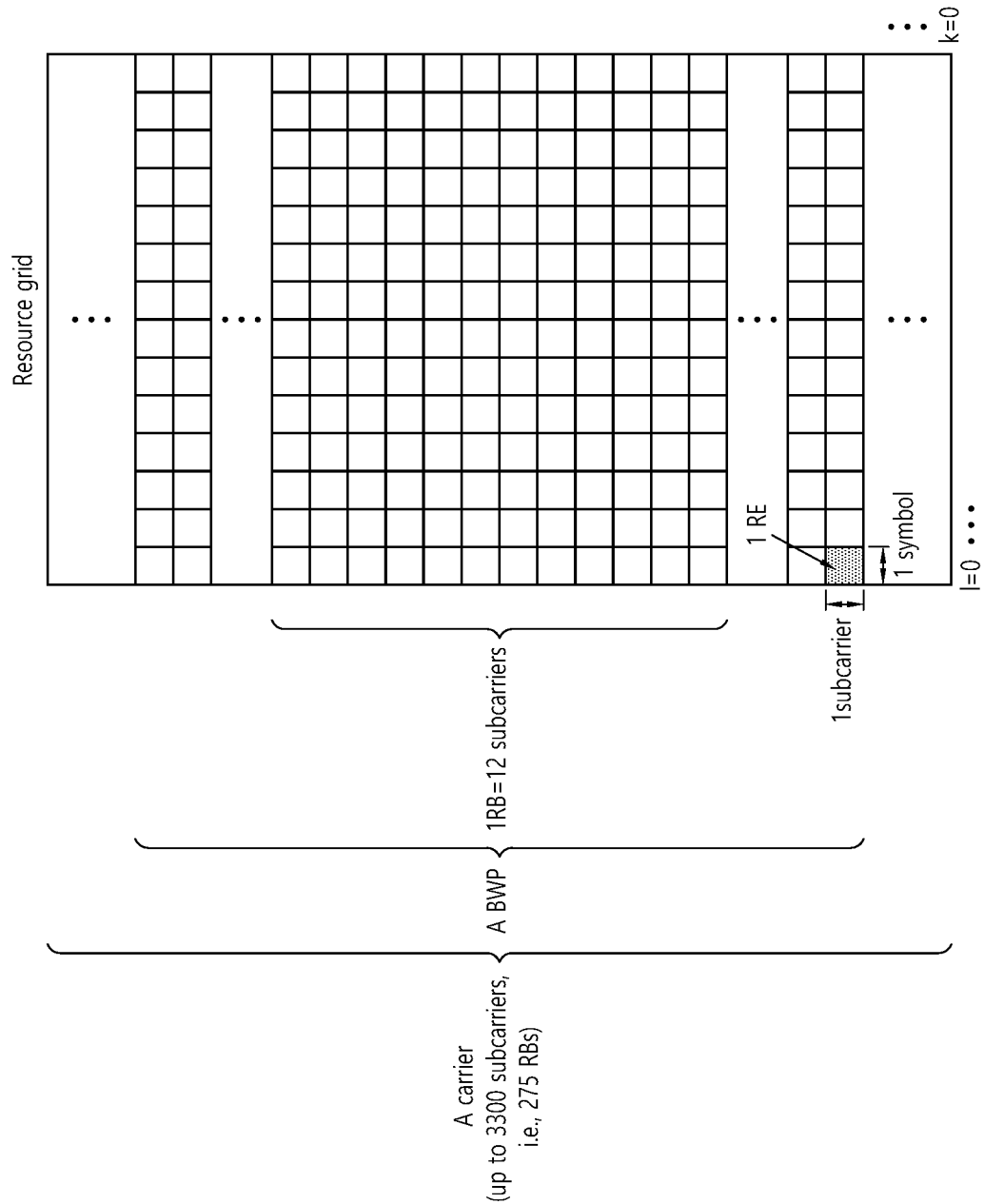
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
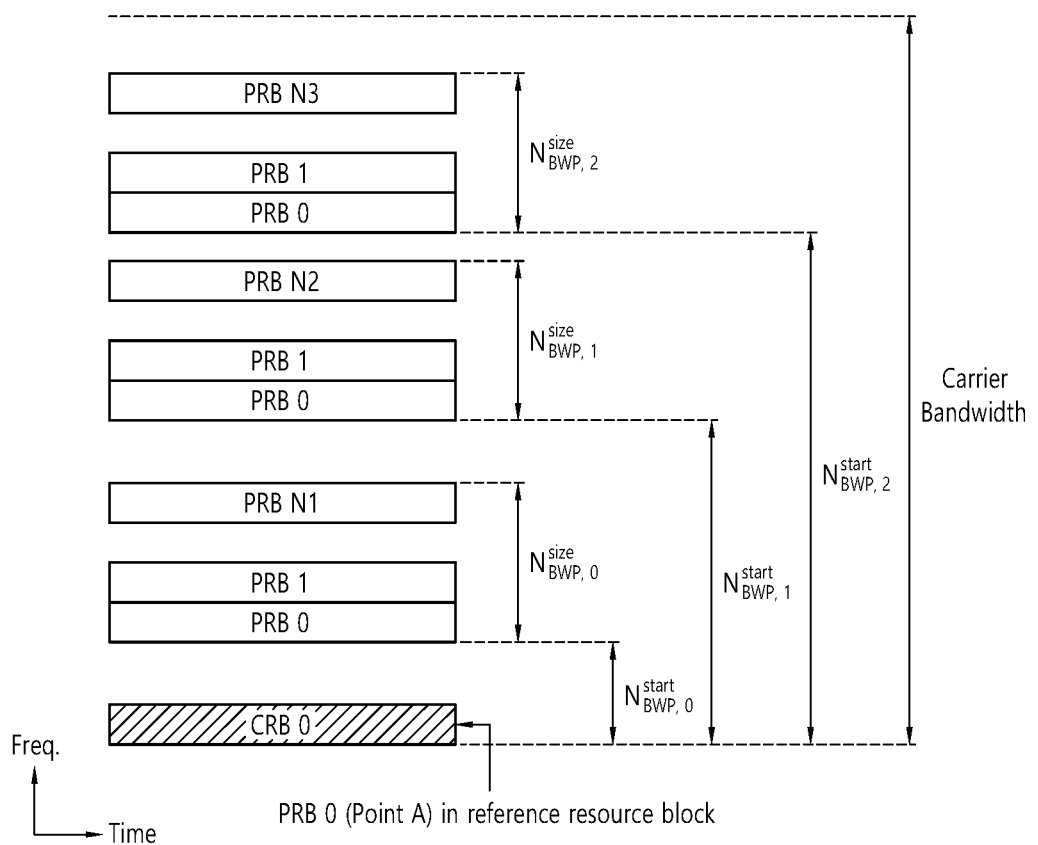
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
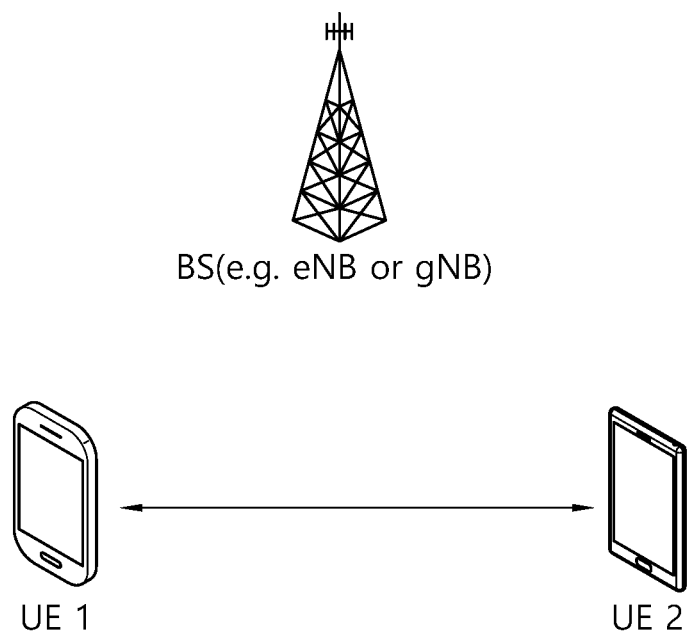
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
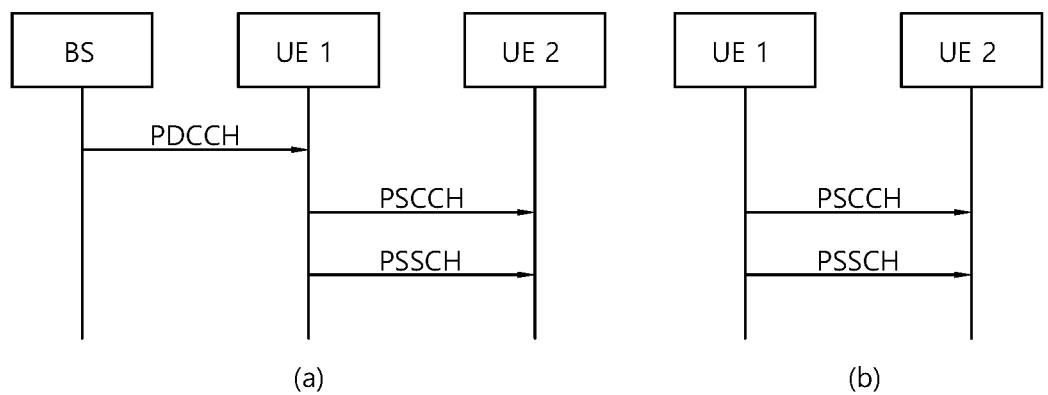
FIG. 8(a) and FIG. 8(b) show a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to a general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
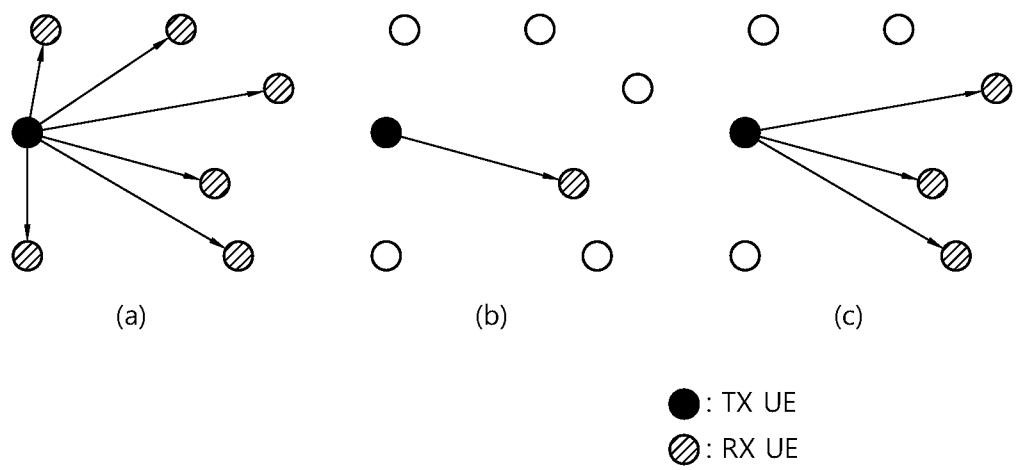
FIG. 9(a), FIG. 9(b), and FIG. 9(c) show three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in the present disclosure, for example, a transmitting UE (TX UE) may be a UE which transmits data to a (target) receiving UE (RX UE). For example, the TX UE may be a UE which performs PSCCH transmission and/or PSSCH transmission. Additionally/alternatively, for example, the TX UE may be a UE which transmits SL CSI-RS(s) and/or a SL CSI report request indicator to the (target) RX UE. Additionally/alternatively, for example, the TX UE may be a UE which transmits a (control) channel (e.g., PSCCH, PSSCH, etc.) and/or reference signal(s) on the (control) channel (e.g., DM-RS, CSI-RS, etc.), to be used for a SL radio link monitoring (RLM) operation and/or a SL radio link failure (RLF) operation of the (target) RX UE.

Meanwhile, in the present disclosure, for example, a receiving UE (RX UE) may be a UE which transmits SL HARQ feedback to a transmitting UE (TX UE) based on whether decoding of data received from the TX UE is successful and/or whether detection/decoding of a PSCCH (related to PSSCH scheduling) transmitted by the TX UE is successful. Additionally/alternatively, for example, the RX UE may be a UE which performs SL CSI transmission to the TX UE based on SL CSI-RS(s) and/or a SL CSI report request indicator received from the TX UE. Additionally/alternatively, for example, the RX UE is a UE which transmits a SL (L1) reference signal received power (RSRP) measurement value, to the TX UE, measured based on (pre-defined) reference signal(s) and/or a SL (L1) RSRP report request indicator received from the TX UE. Additionally/alternatively, for example, the RX UE may be a UE which transmits data of the RX UE to the TX UE. Additionally/alternatively, for example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, for example, in case the RX UE transmits SL HARQ feedback information for a PSSCH and/or a PSCCH received from the TX UE, the following options or some of the following options may be considered. Herein, for example, the following options or some of the following options may be limitedly applied only if the RX UE successfully decodes/detects a PSCCH scheduling a PSSCH.

(1) groupcast option 1: no acknowledgement (NACK) information may be transmitted to the TX UE only if the RX UE fails to decode/receive the PSSCH received from the TX UE.

(2) groupcast option 2: If the RX UE succeeds in decoding/receiving the PSSCH received from the TX UE, ACK information may be transmitted to the TX UE, and if the RX UE fails to decode/receive the PSSCH, NACK information may be transmitted to the TX UE.

Meanwhile, in the present disclosure, for example, the TX UE may transmit the following information or some of the following information to the RX UE through SCI(s). Herein, for example, the TX UE may transmit some or all of the following information to the RX UE through a first SCI and/or a second SCI.

- PSSCH (and/or PSCCH) related resource allocation information (e.g., the location/number of time/frequency resources, resource reservation information (e.g., period))
- SL CSI report request indicator or SL (L1) reference signal received power (RSRP) (and/or SL (L1) reference signal received quality (RSRQ) and/or SL (L1) reference signal strength indicator (RSSI)) report request indicator
- SL CSI transmission indicator (or SL (L1) RSRP (and/or SL (L1) RSRQ and/or SL (L1) RSSI) information transmission indicator) (on a PSSCH)
- Modulation and Coding Scheme (MCS) information
- TX power information
- L1 destination ID information and/or L1 source ID information
- SL HARQ process ID information
- New Data Indicator (NDI) information Redundancy Version (RV) information
(Transmission traffic/packet related) QoS information (e.g., priority information)
SL CSI-RS transmission indicator or information on the number of antenna ports for (transmitting) SL CSI-RS
TX UE location information or location (or distance range) information of the target RX UE (for which SL HARQ feedback is requested)
Reference signal (e.g., DM-RS, etc.) information related to decoding (and/or channel estimation) of data transmitted through a PSSCH. For example, information related to a pattern of (time-frequency) mapping resources of DM-RS(s), RANK information, antenna port index information, information on the number of antenna ports, etc.

Meanwhile, in the present disclosure, for example, since the TX UE may transmit a SCI, a first SCI and/or a second SCI to the RX UE through a PSCCH, the PSCCH may be replaced/substituted with the SCI and/or the first SCI and/or the second SCI. Additionally/alternatively, the SCI may be replaced/substituted with the PSCCH and/or the first SCI and/or the second SCI. Additionally/alternatively, for example, since the TX UE may transmit a second SCI to the RX UE through a PSSCH, the PSSCH may be replaced/substituted with the second SCI.

Meanwhile, in the present disclosure, for example, if SCI configuration fields are divided into two groups in consideration of a (relatively) high SCI payload size, the first SCI including a first SCI configuration field group may be referred to as a $1^{st}$ SCI, and the second SCI including a second SCI configuration field group may be referred to as a $2^{nd}$ SCI. Also, for example, the $1^{st}$ SCI may be transmitted to the receiving UE through a PSCCH. Also, for example, the $2^{nd}$ SCI may be transmitted to the receiving UE through a (independent) PSCCH or may be piggybacked and transmitted together with data through a PSSCH.

Meanwhile, in the present disclosure, for example, the term "configure/configured" or the term "define/defined" may refer to (pre)configuration from a base station or a network (through pre-defined signaling (e.g., SIB, MAC, RRC, etc.)) (for each resource pool).

Meanwhile, in the present disclosure, for example, since an RLF may be determined based on out-of-synch (OOS) indicator(s) or in-synch (IS) indicator(s), the RLF may be replaced/substituted with out-of-synch (OOS) indicator(s) or in-synch (IS) indicator(s).

Meanwhile, in the present disclosure, for example, an RB may be replaced/substituted with a subcarrier. Also, in the present disclosure, for example, a packet or a traffic may be replaced/substituted with a TB or a MAC PDU based on a transmission layer.

Meanwhile, in the present disclosure, a CBG may be replaced/substituted with a TB.

Meanwhile, in the present disclosure, for example, a source ID may be replaced/substituted with a destination ID.

Meanwhile, in the present disclosure, for example, an L1 ID may be replaced/substituted with an L2 ID. For example, the L1 ID may be an L1 source ID or an L1 destination ID. For example, the L2 ID may be an L2 source ID or an L2 destination ID.

Meanwhile, in the present disclosure, for example, an operation of the transmitting UE to reserve/select/determine retransmission resource(s) may include: an operation of the transmitting UE to reserve/select/determine potential retransmission resource(s) for which actual use will be determined based on SL HARQ feedback information received from the receiving UE.

Meanwhile, in the present disclosure, a sub-selection window may be replaced/substituted with a selection window and/or the pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. In addition, for example, cast may be replaced/substituted with at least one of unicast, groupcast, and/or broadcast, or vice versa. For example, a cast type may be replaced/substituted with at least one of unicast, groupcast, and/or broadcast, or vice versa.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), QoS profile, QoS parameter and/or requirement, or vice versa.

Meanwhile, in various embodiments of the present disclosure, the reservation resource and/or the selection resource may be replaced/substituted with a sidelink grant (SL GRANT).

Meanwhile, in various embodiments of the present disclosure, latency may be replaced/substituted with a packet delay budget (PDB).

Meanwhile, in various embodiments of the present disclosure, a message for triggering a report on sidelink channel state information/sidelink channel quality information (hereinafter, SL_CSI information) may be replaced/substituted with a sidelink channel state information reference signal (CSI-RS) reception.

Meanwhile, in the present disclosure, blind retransmission may refer that the TX UE performs retransmission without receiving SL HARQ feedback information from the RX UE. For example, SL HARQ feedback-based retransmission may refer that the TX UE determines whether to perform retransmission based on SL HARQ feedback information received from the RX UE. For example, if the TX UE receives NACK and/or DTX information from the RX UE, the TX UE may perform retransmission to the RX UE.

Meanwhile, in the present disclosure, for example, for convenience of description, a (physical) channel used when a RX UE transmits at least one of the following information to a TX UE may be referred to as a PSFCH.

SL HARQ Feedback, SL CSI, SL (L1) RSRP

Meanwhile, in the present disclosure, a Uu channel may include a UL channel and/or a DL channel. For example, the UL channel may include a PUSCH, a PUCCH, a sounding reference Signal (SRS), etc. For example, the DL channel may include a PDCCH, a PDSCH, a PSS/SSS, etc. For example, a SL channel may include a PSCCH, a PSSCH, a PSFCH, a PSBCH, a PSSS/SSSS, etc.

Meanwhile, in the present disclosure, sidelink information may include at least one of a sidelink message, a sidelink packet, a sidelink service, sidelink data, sidelink control information, and/or a sidelink transport block (TB). For example, sidelink information may be transmitted through a PSSCH and/or a PSCCH.

Meanwhile, in NR V2X communication or NR sidelink communication, a transmitting UE may reserve/select one or more transmission resources for sidelink transmission (e.g., initial transmission and/or retransmission), and the transmitting UE may transmit information on the location of the one or more transmission resources to receiving UE(s).

Meanwhile, when performing sidelink communication, a method for a transmitting UE to reserve or pre-determine transmission resource(s) for receiving UE(s) may be representatively as follows.

For example, the transmitting UE may perform a reservation of transmission resource(s) based on a chain. Specifically, for example, if the transmitting UE reserves K transmission resources, the transmitting UE may transmit location information for less than K transmission resources to receiving UE(s) through a SCI transmitted to the receiving UE(s) at any (or specific) transmission time or a time resource. That is, for example, the SCI may include location information for less than the K transmission resources. Alternatively, for example, if the transmitting UE reserves K transmission resources related to a specific TB, the transmitting UE may transmit location information for less than K transmission resources to receiving UE(s) through a SCI transmitted to the receiving UE(s) at any (or specific) transmission time or a time resource. That is, the SCI may include location information for less than the K transmission resources. In this case, for example, it is possible to prevent performance degradation due to an excessive increase in payloads of the SCI, by signaling only the location information for less than K transmission resources to the receiving UE(s) through one SCI transmitted at any (or specific) transmission time or the time resource by the transmitting UE.

FIG. 10 shows a method in which a UE that has reserved transmission resource(s) informs another UE of the transmission resource(s), based on an embodiment of the present disclosure. The embodiment of FIG. 10 may be combined with various embodiments of the present disclosure.

Specifically, for example, (a) of FIG. 10 shows a method for performing by a transmitting UE chain-based resource reservation by transmitting/signaling location information of (maximum) 2 transmission resources to receiving UE(s) through one SCI, in the case of a value of K=4. For example, (b) of FIG. 10 shows a method for performing by a transmitting UE chain-based resource reservation by transmitting/signaling location information of (maximum) 3 transmission resources to receiving UE(s) through one SCI, in the case of a value of K=4. For example, referring to (a) and (b) of FIG. 10, the transmitting UE may transmit/signal only location information of the fourth transmission-related resource to the receiving UE(s) through the fourth (or last) transmission-related PSCCH. For example, referring to (a) of FIG. 10, the transmitting UE may transmit/signal to the receiving UE(s) not only location information of the fourth transmission-related resource but also location information of the third transmission-related resource additionally through the fourth (or last) transmission-related PSCCH. For example, referring to (b) of FIG. 10, the transmitting UE may transmit/signal to the receiving UE(s) not only location information of the fourth transmission-related resource but also location information of the second transmission-related resource and location information of the third transmission-related resource additionally through the fourth (or last) transmission-related PSCCH. In this case, for example, in (a) and (b) of FIG. 10, if the transmitting UE may transmit/signal to the receiving UE(s) only location information of the fourth transmission-related resource through the fourth (or last) transmission-related PSCCH, the transmitting UE may set or designate a field/bit of location information of unused or remaining transmission resource(s) to a pre-configured value (e.g., 0). For example, in (a) and (b) of FIG. 10, if the transmitting UE may transmit/signal to the receiving UE(s) only location information of the fourth transmission-related resource through the fourth (or last) transmission-related PSCCH, the transmitting UE may be set or designate a field/bit of location information of unused or remaining transmission resource(s) to a pre-configured status/bit value indicating/representing the last transmission (among 4 transmissions).

Meanwhile, for example, the transmitting UE may perform a reservation of transmission resource(s) based on a block. Specifically, for example, if the transmitting UE reserves K transmission resources, the transmitting UE may transmit location information for K transmission resources to receiving UE(s) through a SCI transmitted to the receiving UE(s) at any (or specific) transmission time or a time resource. That is, the SCI may include location information for K transmission resources. For example, if the transmitting UE reserves K transmission resources related to a specific TB, the transmitting UE may transmit location information for K transmission resources to receiving UE(s) through a SCI transmitted to the receiving UE(s) at any (or specific) transmission time or a time resource. That is, the SCI may include location information for K transmission resources. For example, (c) of FIG. 10 shows a method for performing by the transmitting UE block-based resource reservation, by signaling location information of 4 transmission resources to receiving UE(s) through one SCI, in the case of a value of K=4.

Meanwhile, for example, according to rules defined in 3GPP TS 38.321 document, the location of transmission resources related to mode 1 SL CG Type-1 and/or mode 2 CG Type-2 may be determined.

Based on an embodiment of the present disclosure, for example, in order to determine the location of transmission resources related to mode 1 SL CG type-1 and/or mode 2 CG type-2, an SFN 0-based slot offset value may be counted based on SL logical slots (e.g., SL numerology unit). For example, the SFN 0-based slot offset value (i.e., SL-TIMEOFFSETCG-TYPE1) may be counted based on SL logical slots belonging to a target resource pool. For example, the UE may count the SFN 0-based slot offset value (i.e., SL-TIMEOFFSETCG-TYPE1) based on SL logical slots belonging to the target resource pool. For example, this counting scheme may be referred to as option A. For example, an SFN 0-based slot offset value may be counted based on UL slots (e.g., Uu numerology unit) to which a resource pool bitmap can be applied. For example, the SFN 0-based slot offset value (i.e., SL-TIMEOFFSETCG-TYPE1) may be counted based on UL slots, DL slots, or Uu slots (e.g., Uu numerology) to which a resource pool bitmap can be applied. For example, the UE may count the SFN 0-based slot offset value (i.e., SL-TIMEOFFSETCG-TYPE1) based on UL slots, DL slots, or Uu slots (e.g., Uu numerology) to which the resource pool bitmap can be applied. This counting scheme may be referred to as option B. Herein, for example, the numerology may include subcarrier spacing and CP length. Herein, for example, the first transmission resource (i.e., 1st transmission resource) determined based on SL-TIMEOFFSETCG-TYPE1 may be a resource belonging to a target resource pool of a mode 1 SL grant. For example, the UE may determine the first transmission resource based on SL-TIMEOFFSETCG-TYPE1 as the resource belonging to the target resource pool of the SL grant.

Also, for example, in the case of the option B, the first transmission resource may be located in a SL slot of a target resource pool which occurs first in the time domain after SL-TIMEOFFSETCG-TYPE1. For example, the UE may determine the first transmission resource in the SL slot of the target resource pool which occurs first in the time domain after SL-TIMEOFFSETCG-TYPE1.

For example, in various embodiments of the present disclosure, "FRAME" may be defined as the pre-configured number of SL slots belonging to a resource pool (e.g., 10 or 10*SL SCS/15). For example, in various embodiments of the present disclosure, "FRAME" may be defined as the pre-configured number of UL slots, DL slots, or Uu slots to which a resource pool bitmap can be applied (e.g., 10 or 10*Uu SCS/15). For example, in various embodiments of the present disclosure, "FRAME" may be "FRAME" in the equation.

For example, after the first transmission resource related to mode 1 SL CG type-1 and/or mode 1 SL CG type-2 is determined based on the rules of various embodiments of the present disclosure, subsequent transmission resources may be considered to occur in a period defined by PERIODICITYSL number of SL slots based on the location of the first transmission resource within the target resource pool. For example, PERIODICITYSL may be a number based on the pre-configured equation. For example, after the UE determines the first transmission resource related to mode 1 SL CG type-1 and/or mode 1 SL CG type-2 based on the rules of various embodiments of the present disclosure, subsequent transmission resources may occur repeatedly in a period defined by PERIODICITYSL number of SL slots based on the location of the first transmission resource within the target resource pool.

Tables 5 and 6 below show methods for determining the location of transmission resources related to sidelink mode 1 SL CG type-1 or mode 2 CG type-2.

TABLE 5

5.8.3 Sidelink
There are two types of transmission without dynamic grant:
- configured grant Type 1 where an sidelink grant is provided by RRC, and stored as configured sidelink grant;
- configured grant Type 2 where an sidelink grant is provided by PDCCH, and stored or cleared as configured sidelink grant based on L1 signalling indicating configured sidelink grant activation or deactivation.

Type 1 and/or Type 2 are configured with a single BWP. Multiple configurations of up to 8 configured grants (including both Type 1 and Type 2, if configured) can be active simultaneously on the BWP.
RRC configures the following parameters when the configured grant Type 1 is configured, as specified in TS 38.331 [5] or TS 36.331 [21]:
- sl-ConfigIndexCG: the identifier of a configured grant for sidelink;
- sl-CS-RNTI: SLCS-RNTI for retransmission;
- sl-NrOfHARQ-Processes: the number of HARQ processes for configured grant;
- sl-PeriodCG: periodicity of the configured grant Type 1;
- sl-TimeOffsetCG-Type1: Offset of a resource with respect to SFN = 0 in time domain, refering to the number of logical slots that can be used for SL transmission;
- sl-TimeResourceCG-Type1: time resource location of the configured grant Type 1;
- sl-CG-MaxTransNumList: the maximum number of times that a TB can be transmitted using the configured grant;
- sl-HARQ-ProcID-offset: offset of HARQ process for configured grant Type 1.

RRC configures the following parameters when the configured grant Type 2 is configured, as specified in TS 38.331 [5]:
- sl-ConfigIndexCG: the identifier of a configured grant for sidelink;
- sl-CS-RNTI: SLCS-RNTI for activation, deactivation, and retransmission;
- sl-NrOfHARQ-Processes: the number of HARQ processes for configured grant;
- sl-PeriodCG: periodicity of the configured grant Type 2;
- sl-CG-MaxTransNumList: the maximum number of times that a TB can be transmitted using the configured grant;
- sl-HARQ-ProcID-offset: offset of HARQ process for configured grant Type 2.

TABLE 6

Upon configuration of a configured grant Type 1, the MAC entity shall for each configured sidelink grant:
1> store the sidelink grant provided by RRC as a configured sidelink grant;
1> initialise or re-initialise the configured sidelink grant to determine PSCCH duration(s) and PSSCH duration(s) according to sl-TimeOffsetCG-Type1 and sl-TimeResourceCG-Type1, and to reoccur with sl-periodCG for transmissions of multiple MAC PDUs according to clause 8.1.2 of TS 38.214 [7].
NOTE 1: If the MAC entity is configured with multiple configured sidelink grants, collision among the configured sidelink grants may occur. How to handle the collision is left to UE implementation.

TABLE 6-continued

After a sidelink grant is configured for a configured grant Type 1, the MAC entity shall consider sequentially that the first slot of the $S^{th}$ sidelink grant occurs in the logical slot for which:
  [(SFN × numberOfSLSlotsPerFrame) + logical slot number in the frame] = (numberOfSLSlotsPerFrame + sl-TimeOffsetCG-Type1+ S × PeriodicitySL) modulo (1024 × numberOfSLSlotsPerFrame).

where $PeriodicitySL = \left\lceil \frac{N}{20 \text{ ms}} \times sl\_periodCG \right\rceil$, and $N$ refers to the number of slots that can be used for SL transmission within 20ms, if configured, of TDD-UL-DL-ConfigCommon as specified in TS 38.331 [5] and clause 8.1.7 of TS 38.214 [7], and numberOfSLSlotsPerFrame refers to the number of logical slots that can be used for SL transmission.
After a sidelink grant is configured for a configured grant Type 2, the MAC entity shall consider sequentially that the first slot of $S^{th}$ sidelink grant occurs in the logical slot for which:
  [(SFN × numberOfSLSlotsPerFrame) + logical slot number in the frame] = [(SFN$_{start\ time}$ × numberOfSLSlotsPerFrame + slot$_{start\ time}$) + S × PeriodicitySL] modulo (1024 × numberOfSLSlotsPerFrame).
where SFN$_{start\ time}$ and slot$_{start\ time}$ are the SFN and logical slot, respectively, of the first transmission opportunity of PSSCH where the configured sidelink grant was (re-)initialised.

Based on an embodiment of the present disclosure, when a MAC PDU is transmitted by using a HARQ feedback method for which NACK is only transmitted (hereinafter referred to as NACK ONLY HARQ feedback method) based on a distance between a transmitting UE and a receiving UE (hereinafter referred to as TX-RX distance), if location information of the transmitting UE becomes unavailable, the transmitting UE may be configured to transmit the same MAC PDU by using a NACK ONLY HARQ feedback method that does not consider the distance between the transmitting UE and the receiving UE. For example, when the MAC PDU is transmitted by using the TX-RX distance-based NACK ONLY HARQ feedback method, if the location information of the transmitting UE becomes unavailable, the transmitting UE may transmit the same MAC PDU by using the NACK ONLY HARQ feedback method that does not consider the distance between the transmitting UE and the receiving UE.

For example, when a MAC PDU is transmitted by using the TX-RX distance-based NACK ONLY HARQ feedback method, if the location information of the transmitting UE becomes unavailable, the transmitting UE may be configured to transmit the same MAC PDU by using a HARQ feedback method for which ACK or NACK is transmitted without considering the distance between the transmitting UE and the receiving UE (hereinafter referred to as ACK/ NACK HARQ feedback method). For example, when the MAC PDU is transmitted by using the TX-RX distance-based NACK ONLY HARQ feedback method, if the location information of the transmitting UE becomes unavailable, the transmitting UE may transmit the same MAC PDU by using the ACK/NACK HARQ feedback method that does not consider the distance between the transmitting UE and the receiving UE.

For example, when a MAC PDU is transmitted by using the TX-RX distance-based NACK ONLY HARQ feedback method, location information of the transmitting UE may become unavailable. For example, in this case, if group size information and/or a group member ID of the transmitting UE is provided from an upper layer of the transmitting UE, and if the number of PSFCH candidate resources associated with PSSCH transmission within a resource pool is greater than or equal to the group size, the transmitting UE may transmit the same MAC PDU by using the NACK ONLY HARQ feedback method that does not consider the distance between the transmitting UE and the receiving UE. For example, in this case, if group size information and/or a group member ID of the transmitting UE is provided from an upper layer of the transmitting UE, and if the number of PSFCH candidate resources associated with PSSCH transmission within a resource pool is greater than or equal to the group size, the transmitting UE may transmit the same MAC PDU by using the ACK/NACK HARQ feedback method that does not consider the distance between the transmitting UE and the receiving UE.

Herein, for example, if location information of the transmitting UE for retransmission related to the MAC PDU is changed from the location of the transmitting UE for the first/initial transmission related to the MAC PDU, the transmitting UE may include the updated location information in the retransmission.

Also, for example, the receiving UE may receive the first/initial transmission related to the MAC PDU from the transmitting UE in the TX-RX distance-based NACK ONLY HARQ feedback method, and the receiving UE may receive retransmission of the same MAC PDU. In this case, for example, if location information of the receiving UE is changed, the receiving UE may be configured to use its own location information at the time of receiving the first/initial transmission when calculating the TX-RX distance for determining whether or not to transmit NACK ONLY HARQ feedback. In this case, for example, if location information of the receiving UE is changed, the receiving UE may be configured to use updated location information of the receiving UE at the time of receiving retransmission when calculating the TX-RX distance for determining whether or not to transmit NACK ONLY HARQ feedback. In this case, for example, if location information of the receiving UE is changed, the receiving UE may be configured to use its own location information at the time of receiving the first/initial transmission and updated location information at the time of receiving retransmission when calculating the TX-RX distance for determining whether or not to transmit NACK ONLY HARQ feedback.

Herein, for example, when the receiving UE calculates a value for the TX-RX distance, location information of the transmitting UE used by the receiving UE may be set to location information of the transmitting UE for the first/ initial transmission. For example, when the receiving UE calculates a value for the TX-RX distance, location information of the transmitting UE used by the receiving UE may be set to location information of the transmitting UE for retransmission. For example, when the receiving UE calculates a value for the TX-RX distance, location information of the transmitting UE used by the receiving UE may be set to at least one of location information of the transmitting UE for the first initial transmission or location information of the transmitting UE for retransmission. For example, the receiving UE may be a receiving UE receiving retransmission. That is, for example, when the receiving UE receiving retransmission calculates a value for the TX-RX distance, location information of the transmitting UE used by the receiving UE may be set to location information of the transmitting UE used in the first/initial transmission.

Based on an embodiment of the present disclosure, for example, when SL HARQ feedback information related to a PSFCH is transmitted through a PUCCH, if the number of PSSCH slots associated with a PSFCH is changed, a codebook size related to SL HARQ feedback information transmitted through a PUCCH may be changed according to the number of PSSCH slots. For example, when SL HARQ feedback information related to the pre-configured number of PSFCHs is transmitted through a PUCCH, if the number of PSSCHs and/or PSCCH slots associated with the corresponding PSFCH is changed in the time domain, the number of bits or the semi-static codebook size related to SL HARQ feedback information transmitted through a PUCCH may change according to the changed number of associated PSSCHs and/or PSCCH slots. For example, when the UE transmits SL HARQ feedback information related to the pre-configured number of PSFCHs to the base station through a PUCCH, if the number of PSSCH and/or PSCCH slots associated with the corresponding PSFCH is changed in the time domain, the number of bits or the semi-static codebook size related to SL HARQ feedback information transmitted through a PUCCH may be changed according to the changed number of PSSCH and/or PSCCH slots.

Based on an embodiment of the present disclosure, for example, in case that the transmitting UE performs HARQ feedback request-based initial transmission for a MAC PDU based on an allocated mode 1 resource, a time gap between the time of receiving a PSFCH and the time of an additionally allocated mode 1 retransmission resource (hereinafter, RRSC_ADD) may be smaller than a minimum processing time that can be supported by the UE. In this case, for example, the transmitting UE may skip/omit the retransmission operation on RRSC_ADD. In this case, for example, the transmitting UE may drop the related MAC PDU on RRSC_ADD. In this case, for example, the transmitting UE may perform blind retransmission (e.g., retransmission that does not request HARQ feedback) on RRSC_ADD.

For example, in case that the transmitting UE performs HARQ feedback request-based initial transmission and/or retransmission for a MAC PDU based on allocated mode 1 resources, a time gap between the time when the transmitting UE receives a PSFCH and the time when RRSC_ADD is additionally allocated for the same MAC PDU may be smaller than a minimum processing time that can be supported by the UE. In this case, for example, the transmitting UE may skip/omit the retransmission operation on RRSC_ADD. In this case, for example, the transmitting UE may drop the related MAC PDU on RRSC_ADD. In this case, for example, the transmitting UE may perform blind retransmission (e.g., retransmission that does not request HARQ feedback) on RRSC_ADD.

For example, based on various rules of the present disclosure, if a TDD U/D configuration is not configured, it may be configured to derive TDD-CONFIG information in a PSBCH. For example, based on the rules described in Table 7, if the TDD U/D configuration is not configure, it may be configured to derive a UL resource (e.g., slot) to which a resource pool bitmap is applied. For example, the resource pool bitmap may be pre-configured.

Table 7 below describes rules for determining a bit sequence of sl-TDD-Config in a PSBCH when tdd-UL-DL-ConfigurationCommon or sl-TDD-Configuration is not provided. For example, if tdd-UL-DL-ConfigurationCommon (e.g., SIB1) or sl-TDD-Configuration (e.g., pre-configuration) is not provided, it is necessary to clarify how the UE determines the bit sequence of sl-TDD-Config (i.e., a0, a1, a2, a3, . . . , a11) in the PSBCH or the assumption about the UL resource to which the resource pool bitmap is applied.

TABLE 7

We think that the following two aspects should be clarified for the case when tdd-UL-DL-ConfigurationCommon (e.g., SIB1) or sl-TDD-Configuration (e.g., Pre-configuration) is not provided.
Otherwise, SL sync operation would not be supported correctly because different UEs' behaviours are not aligned.
•        Issue A) How a UE determines a bit sequence (i.e., $a_0, a_1, a_2, a_3, ..., a_{11}$) of sl-TDD-Config in PSBCH?
•        Issue B) Assumption of UL resources to which the resource pool bitmap is applied?
The following rule can be applied to determine a bit sequence of sl-TDD-Config in PSBCH when tdd-UL-DL-ConfigurationCommon or sl-TDD-Configuration is not provided. With this approach, it could be possible to support SFNed TX of PSBCHs among different UEs having the same sync source (e.g., gNB, GNSS). Also there is no need to use the reserved bit states remained for the usage of future release.
•        $a_0$ (i.e., pattern number):
    -   0 (i.e., single pattern) (and/or 1 (i.e., two patterns))
•        $a_1,a_2,a_3,a_4$ (i.e., pattern period):
    -   0,0,1,0 (i.e., 1ms) (and/or 1,0,0,0 (i.e., 10ms) and/or (pre)configured pattern period )
        ✓ Note that 1ms (or 10ms) is the smallest (or largest) value of periods that can used for all the
          SCS cases
•        $a_5,a_6,a_7,a_8,a_9,a_{10},a_{11}$ (i.e., UL slot number):
    -   All the slots determined by "$a_0$", "$a_1,a_2,a_3,a_4$" and "SL SCS" are indicated as UL (and/or
       "$a_5,a_6,a_7\ a_8,a_9,a_{10},a_{11}$" is set to "1,1,1,1,1,1,1")
For Issue B in Q1, for example, it can be defined that a UE assumes a virtual TDD configuration with one pattern with 1ms (and/or 10ms) period (and/or (pre)configured period) and all the symbols/slots designated as UL. The SCS of virtual TDD configuration is SL SCS. Note that UL slots of virtual TDD configuration are the same as those of sl-TDD-Config indicated by PSBCH in Issue A.

Based on the rules of Table 7, PSBCH transmission can be supported between different UEs having the same synchronization source (e.g., gNB, GNSS). Also, for example, there may be no need to use the remaining reserved bit states. Referring to Table 7, herein, for example, a0 (i.e., a pattern number) may be 0 (i.e., a single pattern) or 1 (i.e., two patterns). Herein, for example, a1, a2, a3, a4 (i.e., pattern period) may be 0, 0, 1, 0 (i.e., 1 ms) or 1, 0, 0, 0 (i.e., 10 ms) or a configured pattern period. Herein, for example, the configured pattern period may be pre-configured. For example, 1 ms may be the smallest period value that can be used for all SCS cases. For example, 10 ms may be the largest period value that can be used for all SCS cases. Herein, for example, in a5, a6, a7, a8, a9, a10, all (i.e., UL slot number), all slots determined by "a0", "a1, a2, a3, a4" and "SL SCS" may be represented as UL. For example, "a5, a6, a7, a8, a9, a10, a11" may be set to "1, 1, 1, 1, 1, 1, 1". For example, it may be defined that the UE assumes a virtual TDD configuration with one pattern having 1 ms and all symbols/slots designated as UL. For example, it may be defined that the UE assumes a virtual TDD configuration with one pattern having 10 ms and all symbols/slots designated as UL. For example, it may be defined that the UE assumes a virtual TDD configuration with one pattern having a configured period and all symbols/slots designated as UL. For example, the configured period may be pre-configured. For example, SCS of the virtual TDD configuration may be SL SCS. For example, a UL slot of the virtual TDD configuration may be the same as a UL slot of sl-TDD-Config indicated by a PSBCH.

Based on an embodiment of the present disclosure, for example, a reference Uu DCI format used for size alignment with DCI format 3_0 may be designated as one requiring a smaller number of zero-padding bits among Uu DCI 0_1 and UU DCI 0_2. For example, a reference Uu DCI format used for size alignment with DCI format 3_0 may be designated as one requiring a smaller number of zero-padding bits among at least one of Uu DCI 0_1 or Uu DCI 0_0 and UU DCI 0_2. For example, the UE may determine a reference Uu DCI format used for size alignment with DCI format 3_0 as one requiring a smaller number of zero-padding bits among at least one of Uu DCI 0_1 or Uu DCI 0_0 and UU DCI 0_2. Herein, for example, the reference Uu DCI format may be transmitted on USS. For example, the reference Uu DCI format may be transmitted on CSS. For example, the reference Uu DCI format may be a fallback Uu DCI format. For example, the reference Uu DCI format may be a non-fallback Uu DCI format.

Additionally, for example, a transferred sidelink grant and related sidelink transmission information may be associated with a sidelink process. For example, each sidelink process may support one TB. For example, for each sidelink grant, a sidelink HARQ entity may perform the following operation.

For example, the sidelink HARQ entity may select positive-negative acknowledgment or negative-only acknowledgment. That is, for example, selection of positive-negative acknowledgment or negative-only acknowledgment may be UE implementation. In this case, for example, the UE may select negative-only acknowledgment. For example, if the UE selects negative-only acknowledgment, location information of the UE may be available, and sl-TransRange may be configured for a logical channel of a MAC PDU, and sl-ZoneConfig may be configured. Herein, for example, sl-TransRange may indicate a communication range requirement. For example, sl-ZoneConfig may indicate zone configuration.

For example, the sidelink HARQ entity may determine a value of sl-ZoneLength corresponding to a communication range requirement, and may set Zone_id to a value of Zone_id calculated using the determined value of sl-ZoneLength. For example, sl-ZoneLength may indicate the length of each geographic zone.

For example, the sidelink HARQ entity may transfer the MAC PDU, a sidelink grant, and sidelink transmission information of the TB to the related sidelink process.

For example, in case of retransmission, the sidelink HARQ entity may transfer a sidelink grant of the MAC PDU to the related sidelink process.

For example, for each PSSCH period in which transmission for a sidelink process occurs, one TB and related HARQ information may be received from the sidelink HARQ entity.

For example, if SCI indicates negative-only acknowledgment, location information of the UE may be available, and the distance between the location of the UE and the central of the closest zone calculated based on Zone_id in SCI and the value of sl-ZoneLength corresponding to the communication range requirement of SCI may be smaller than or equal to the communication range requirement of SCI.

Figure 11:
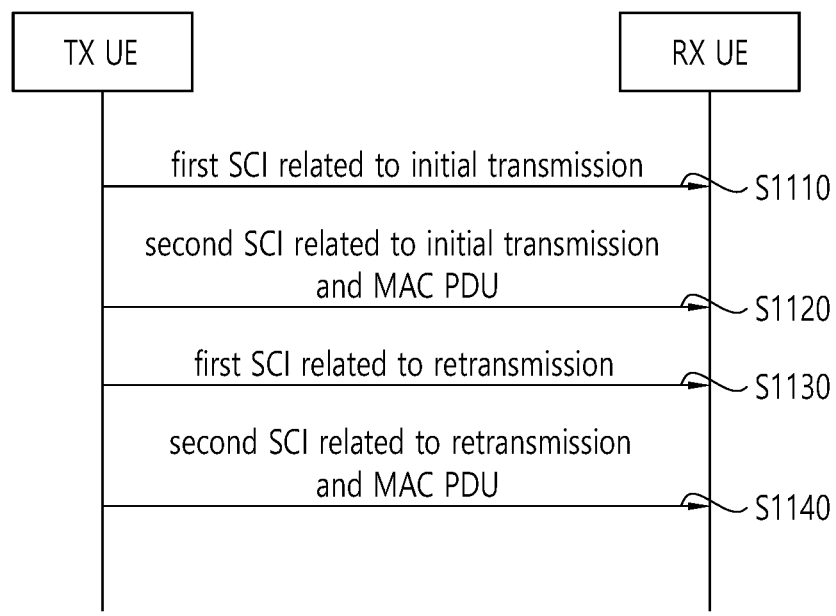
FIG. 11 shows a procedure for transmitting, by a transmitting UE, SCI including location information of the transmitting UE and a MAC PDU to a receiving UE, based on an embodiment of the present disclosure.
Figure 13:
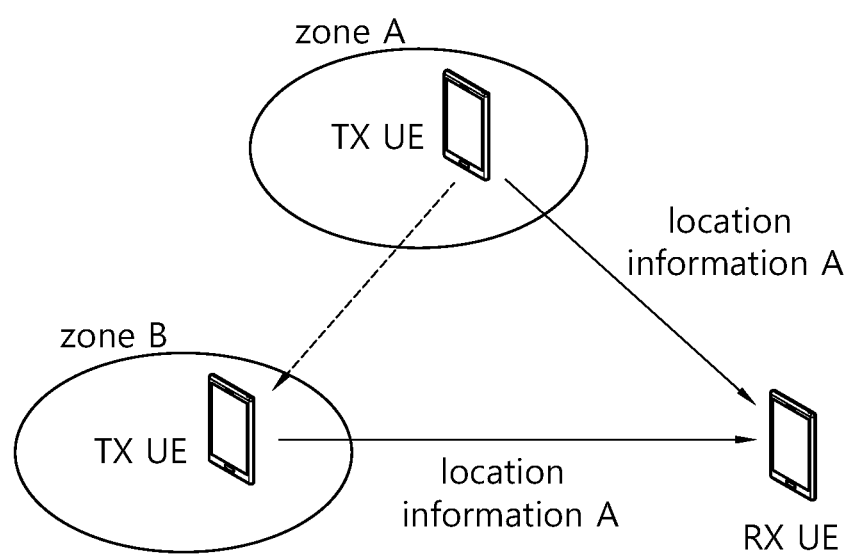
FIG. 13 shows an example in which the location of a transmitting UE is changed, based on an embodiment of the present disclosure.

FIG. 11 shows a procedure for transmitting, by a transmitting UE, SCI including location information of the transmitting UE and a MAC PDU to a receiving UE, based on an embodiment of the present disclosure. FIG. 13 shows an example in which the location of a transmitting UE is changed, based on an embodiment of the present disclosure. The embodiments of FIGS. 11 and 13 may be combined with various embodiments of the present disclosure.

Referring to FIG. 11, in step S1110, the transmitting UE may transmit first sidelink control information (SCI) related to initial transmission to the receiving UE through a first physical sidelink control channel (PSCCH). For example, the first SCI related to initial transmission may include scheduling information of second SCI related to initial transmission transmitted through a first physical sidelink shared channel (PSSCH) related to the first PSCCH.

In step S1120, the transmitting UE may transmit the second SCI and a medium access control (MAC) protocol data unit (PDU) related to initial transmission to the receiving UE through the first PSSCH. For example, the second SCI related to initial transmission may include location information of the transmitting UE related to initial transmission. For example, a distance between the transmitting UE and the receiving UE may be calculated based on location information of the transmitting UE related to initial transmission.

Additionally, for example, the location information of the transmitting UE may include a zone ID of the transmitting UE. For example, the receiving UE may calculate the distance between the transmitting UE and the receiving UE based on the zone ID of the transmitting UE.

In step S1130, the transmitting UE may transmit first SCI related to retransmission to the receiving UE through a second PSCCH. For example, the first SCI related to retransmission may include scheduling information of second SCI related to retransmission transmitted through a second PSSCH related to the second PSCCH.

In step S1140, the transmitting UE may transmit the second SCI and a MAC PDU related to retransmission to the receiving UE through the second PSSCH. For example, the second SCI related to retransmission may include location information of the transmitting UE related to initial transmission.

For example, the transmitting UE may transmit the second SCI related to retransmission to the receiving UE through the second PSSCH, and the transmitting UE may perform blind retransmission for the MAC PDU to the receiving UE. That is, for example, the transmitting UE may perform blind retransmission for the MAC PDU to the receiving UE without receiving HARQ feedback from the receiving UE.

For example, based on the change in location information of the transmitting UE, the second SCI related to retransmission may include location information of the transmitting UE related to retransmission.

Referring to FIG. 13, for example, in case that the transmitting UE is located in the zone A, the transmitting UE may transmit SCI including location information of the zone A and a MAC PDU to the receiving UE through a PSSCH. Then, for example, if the location of the transmitting UE is changed from the zone A to the zone B, the transmitting UE may still retransmit SCI including location information of the zone A and a MAC PDU to the receiving UE through a PSSCH.

Figure 12:
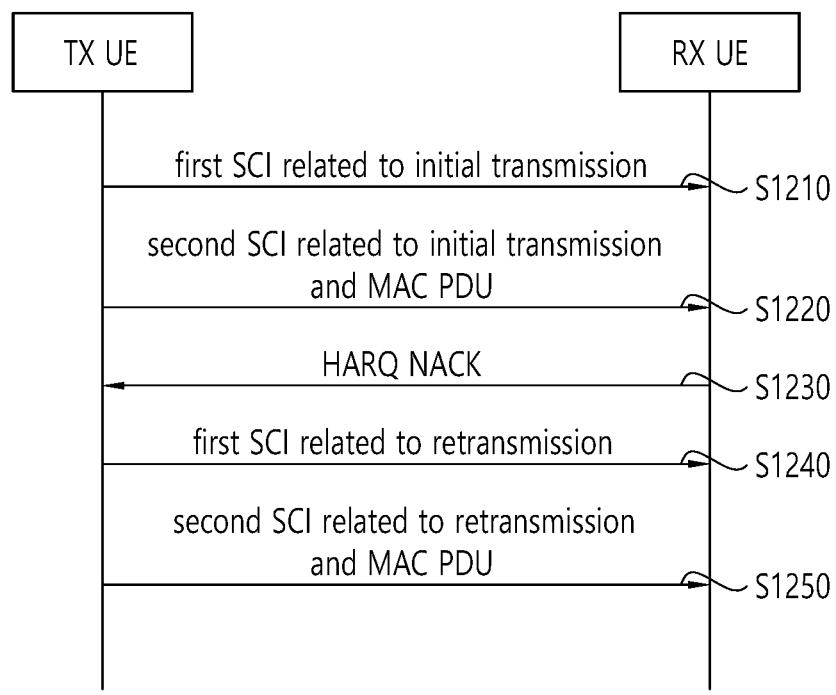
FIG. 12 shows another procedure for transmitting, by a transmitting UE, SCI including location information of the transmitting UE and a MAC PDU to a receiving UE, based on an embodiment of the present disclosure.

FIG. 12 shows another procedure for transmitting, by a transmitting UE, SCI including location information of the transmitting UE and a MAC PDU to a receiving UE, based on an embodiment of the present disclosure. The embodiment of FIG. 12 may be combined with various embodiments of the present disclosure. FIG. 12 may be combined with various embodiments of the present disclosure.

Referring to FIG. 12, in step S1210, the transmitting UE may transmit first SCI related to initial transmission to the receiving UE through a first PSCCH. For example, the first SCI related to initial transmission may include scheduling information of second SCI related to initial transmission transmitted through a first PSSCH related to the first PSCCH.

In step S1220, the transmitting UE may transmit the second SCI and a MAC PDU related to initial transmission to the receiving UE through the first PSSCH. For example, the second SCI related to initial transmission may include location information of the transmitting UE related to initial transmission. For example, a distance between the transmitting UE and the receiving UE may be calculated based on location information of the transmitting UE related to initial transmission.

For example, a method of HARQ NACK-only feedback may be enabled. For example, the method of HARQ NACK-only feedback may be enabled for the transmitting UE or the receiving UE. For example, the method of HARQ NACK-only feedback may be a method of transmitting NACK information to the transmitting UE only when the receiving UE fails to decode/receive a PSSCH received from the transmitting UE.

For example, an HARQ feedback method not based on a distance between the transmitting UE and the receiving UE may be configured based on that location information of the transmitting UE is not available. For example, the HARQ feedback method may be a HARQ NACK-only feedback method. For example, the HARQ feedback method may be an ACK or NACK feedback method. For example, the ACK or NACK feedback method may be a method in which the receiving UE transmits ACK information to the transmitting UE if the receiving UE succeeds in decoding/receiving a PSSCH received from the transmitting UE, and the receiving UE transmits NACK information to the transmitting UE if the receiving UE fails to decode/receive a PSSCH received from the transmitting UE.

Additionally, for example, the location information of the transmitting UE may include a zone ID of the transmitting UE. For example, the receiving UE may calculate the distance between the transmitting UE and the receiving UE based on the zone ID of the transmitting UE.

In step S1230, the transmitting UE may receive HARQ NACK for the MAC PDU from the receiving UE. For example, the transmitting UE may receive HARQ NACK for the MAC PDU from the receiving UE through a PSFCH.

In step S1240, the transmitting UE may transmit first SCI related to retransmission to the receiving UE through a second PSCCH. For example, the first SCI related to retransmission may include scheduling information of second SCI related to retransmission transmitted through a second PSSCH related to the second PSCCH.

In step S1250, the transmitting UE may transmit the second SCI and a MAC PDU related to retransmission to the receiving UE through the second PSSCH. For example, the second SCI related to retransmission may include location information of the transmitting UE related to initial transmission. For example, based on that the transmitting UE receives the HARQ NACK, the transmitting UE may transmit the second SCI and the MAC PDU related to retransmission to the receiving UE through the second PSSCH.

Referring to FIG. 13, for example, if the transmitting UE is located in the zone A, the transmitting UE may transmit SCI including location information of the zone A and a MAC PDU to the receiving UE through a PSSCH. For example, if the location of the transmitting UE is changed from the zone A to the zone B, and if the transmitting UE receives HARQ NACK from the receiving UE, the transmitting UE may still retransmit SCI including location information of the zone A and a MAC PDU to the receiving UE through a PSSCH.

Alternatively, for example, if the location of the transmitting UE is changed from the zone A to the zone B, and if the transmitting UE receives HARQ NACK from the receiving UE, the transmitting UE may retransmit SCI including location information of the zone B and a MAC PDU to the receiving UE through a PSSCH.

Alternatively, for example, if the location of the transmitting UE is changed from the zone A to the zone B, and if the transmitting UE receives HARQ NACK from the receiving UE, the transmitting UE may retransmit SCI including location information of the zone A and location information of the zone B, and a MAC PDU to the receiving UE through a PSSCH.

For example, a method of HARQ NACK-only feedback may be based on a distance between the transmitting UE and the receiving UE. For example, the distance between the transmitting UE and the receiving UE may be calculated based on location information of the transmitting UE related to initial transmission.

For example, based on the change in location information of the transmitting UE, second SCI related to retransmission may include location information of the transmitting UE related to retransmission.

For example, based on that location information of the receiving UE is changed, second SCI related to retransmission may include location information of the transmitting UE related to initial transmission. Herein, for example, information indicating that location information of the receiving UE is changed may be included in HARQ NACK. For example, based on the change in location information of the receiving UE, at least one of the location of the receiving UE related to initial transmission or the location of the second device related to retransmission may be used to calculate the distance between the transmitting UE and the receiving UE.

Figure 14:
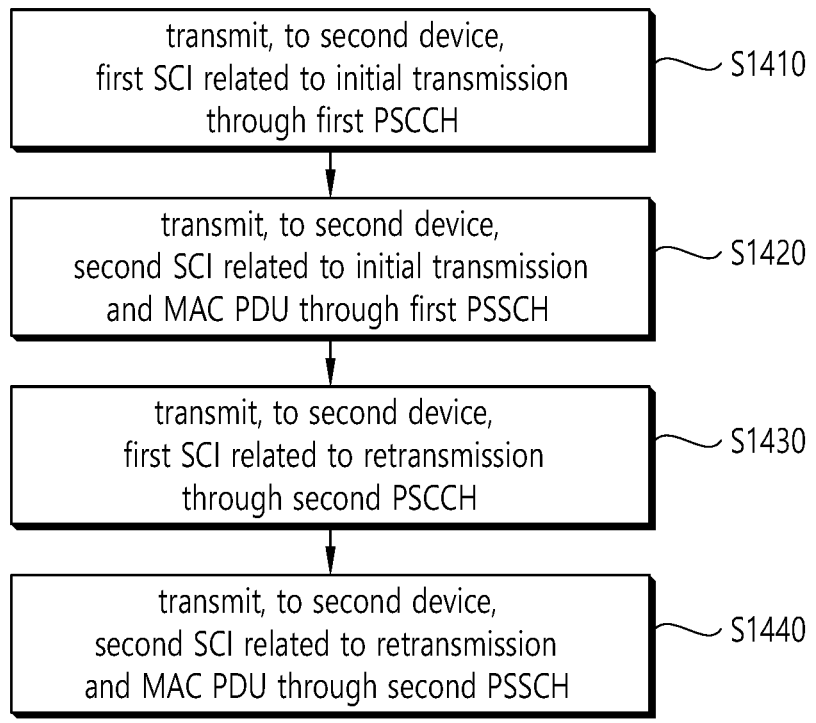
FIG. 14 shows a method for a first device to transmit SCI including location information and a MAC PDU to a second device, based on an embodiment of the present disclosure.

FIG. 14 shows a method for a first device to transmit SCI including location information and a MAC PDU to a second device, based on an embodiment of the present disclosure. The embodiment of FIG. 14 may be combined with various embodiments of the present disclosure.

Referring to FIG. 14, in step S1410, the first device 100 may transmit first sidelink control information (SCI) related to initial transmission to the second device 200 through a first physical sidelink control channel (PSCCH). For example, the first SCI related to initial transmission may include scheduling information of second SCI related to initial transmission transmitted through a first physical sidelink shared channel (PSSCH) related to the first PSCCH.

In step S1420, the first device 100 may transmit the second SCI related to initial transmission and a medium access control (MAC) protocol data unit (PDU) to the second device 200 through the first PSSCH. For example, the second SCI related to initial transmission may include location information of the first device 100 related to initial transmission.

In step S1430, the first device 100 may transmit first SCI related to retransmission to the second device 200 through a second PSCCH. For example, the first SCI related to retransmission may include scheduling information of second SCI related to retransmission transmitted through a second PSSCH related to the second PSCCH.

In step S1440, the first device 100 may transmit the second SCI related to retransmission and the MAC PDU to the second device 200 through the second PSSCH. For example, the second SCI related to retransmission may include the location information related to initial transmission of the first device 100.

For example, based on that the first device 100 receives HARQ NACK from the second device 200, the MAC PDU may be retransmitted.

For example, a method of HARQ NACK-only feedback may be enabled. For example, the method of HARQ NACK-only feedback may be based on a distance between the first device 100 and the second device 200. For example, the distance between the first device 100 and the second device 200 may be calculated based on the location information related to initial transmission of the first device 100.

For example, based on that location information of the second device 200 is changed, the second SCI related to retransmission may include the location information related to initial transmission of the first device 100.

For example, based on that location information of the second device 200 is changed, at least one of the location of the second device 200 related to initial transmission or the location of the second device 200 related to retransmission may be used to calculate the distance between the first device 100 and the second device 200.

For example, an HARQ feedback method not based on the distance between the first device 100 and the second device 200 may be configured based on that location information of the first device 100 is not available. For example, the HARQ feedback method may be a method of HARQ NACK-only feedback. For example, the HARQ feedback method may be a method of ACK or NACK feedback. For example, at least one of group size information may be received, and the number of PSFCH candidate resources in a resource pool related to the HARQ feedback may be greater than or equal to the group size.

For example, the MAC PDU may be blindly retransmitted.

For example, TDD-configuration information on a PSBCH based on a pre-configured rule may be determined based on that a time duplex division (TDD) UL-DL configuration is not configured.

The above-described embodiment can be applied to various the device(s) described below. For example, the processor 102 of the first device 100 may control the transceiver 106 to transmit first sidelink control information (SCI) related to initial transmission to the second device 200 through a first physical sidelink control channel (PSCCH). In addition, for example, the processor 102 of the first device 100 may control the transceiver 106 to transmit second SCI related to initial transmission and a medium access control (MAC) protocol data unit (PDU) through the first PSSCH. In addition, for example, the processor 102 of the first device 100 may control the transceiver 106 to transmit first SCI related to retransmission to the second device 200 through a second PSCCH. In addition, for example, the processor 102 of the first device 100 may control the transceiver 106 to transmit second SCI related to retransmission and the MAC PDU to the second device 200 through the second PSSCH.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device, first sidelink control information (SCI) related to initial transmission through a first physical sidelink control channel (PSCCH), wherein the first SCI related to the initial transmission includes scheduling information of second SCI related to the initial transmission transmitted through a first physical sidelink shared channel (PSSCH) related to the first PSCCH; transmit, to the second device, the second SCI related to the initial transmission and a medium access control (MAC) protocol data unit (PDU) through the first PSSCH, wherein the second SCI related to the initial transmission includes location information related to the initial transmission of the first device; transmit, to the second device, first SCI related to retransmission through a second PSCCH, wherein the first SCI related to the retransmission includes scheduling information of second SCI related to the retransmission transmitted through a second PSSCH related to the second PSCCH; and transmit, to the second device, the second SCI related to the retransmission and the MAC PDU through the second PSSCH, wherein the second SCI related to the retransmission includes the location information related to the initial transmission of the first device.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: transmit, to a second UE, first sidelink control information (SCI) related to initial transmission through a first physical sidelink control channel (PSCCH), wherein the first SCI related to the initial transmission includes scheduling information of second SCI related to the initial transmission transmitted through a first physical sidelink shared channel (PSSCH) related to the first PSCCH; transmit, to the second UE, the second SCI related to the initial transmission and a medium access control (MAC) protocol data unit (PDU) through the first PSSCH, wherein the second SCI related to the initial transmission includes location information related to the initial transmission of the first UE; transmit, to the second UE, first SCI related to retransmission through a second PSCCH, wherein the first SCI related to the retransmission includes scheduling information of second SCI related to the retransmission transmitted through a second PSSCH related to the second PSCCH; and transmit, to the second UE, the second SCI related to the retransmission and the MAC PDU through the second PSSCH, wherein the second SCI related to the retransmission includes the location information related to the initial transmission of the first UE.

Based on an embodiment of the present disclosure, a non-transitory computer-readable storage medium storing instructions may be provided. For example, the instructions, when executed, may cause a first device to: transmit, to a second device, first sidelink control information (SCI) related to initial transmission through a first physical sidelink control channel (PSCCH), wherein the first SCI related to the initial transmission includes scheduling information of second SCI related to the initial transmission transmitted through a first physical sidelink shared channel (PSSCH) related to the first PSCCH; transmit, to the second device, the second SCI related to the initial transmission and a medium access control (MAC) protocol data unit (PDU) through the first PSSCH, wherein the second SCI related to the initial transmission includes location information related to the initial transmission of the first device; transmit, to the second device, first SCI related to retransmission through a second PSCCH, wherein the first SCI related to the retransmission includes scheduling information of second SCI related to the retransmission transmitted through a second PSSCH related to the second PSCCH; and transmit, to the second device, the second SCI related to the retransmission and the MAC PDU through the second PSSCH, wherein the second SCI related to the retransmission includes the location information related to the initial transmission of the first device.

Figure 15:
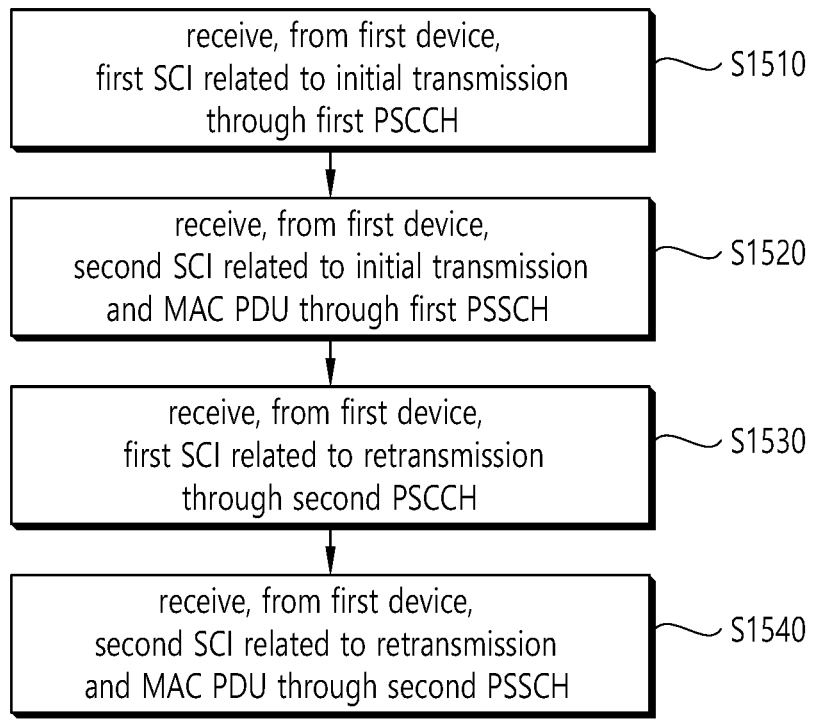
FIG. 15 shows a method for a second device to receive SCI including location information a MAC PDU from a first device, based on an embodiment of the present disclosure.

FIG. 15 shows a method for a second device to receive SCI including location information a MAC PDU from a first device, based on an embodiment of the present disclosure. The embodiment of FIG. 15 may be combined with various embodiments of the present disclosure.

Referring to FIG. 15, in step S1510, the second device 200 may receive first sidelink control information (SCI) related to initial transmission from the first device 100 through a first physical sidelink control channel (PSCCH). For example, the first SCI related to initial transmission may include scheduling information of second SCI related to initial transmission transmitted through a first physical sidelink shared channel (PSSCH) related to the first PSCCH.

In step S1520, the second device 200 may receive the second SCI related to initial transmission and a medium access control (MAC) protocol data unit (PDU) from the first device 100 through the first PSSCH. For example, the second SCI related to initial transmission may include location information related to initial transmission of the first device.

In step S1530, the second device 200 may receive first SCI related to retransmission from the first device 100 through a second PSCCH. For example, the first SCI related to retransmission may include scheduling information of second SCI related to retransmission transmitted through a second PSSCH related to the second PSCCH.

In step S1540, the second device 200 may receive the second SCI related to retransmission and a MAC PDU from the first device 100 through the second PSSCH. For example, the second SCI related to retransmission may include location information related to initial transmission of the first device.

For example, based on that the first device 100 receives HARQ NACK from the second device 200, the MAC PDU may be retransmitted.

For example, a method of HARQ NACK-only feedback may be enabled. For example, the method of HARQ NACK-only feedback may be based on a distance between the first device 100 and the second device 200. For example, the distance between the first device 100 and the second device 200 may be calculated based on the location information related to initial transmission of the first device 100.

For example, based on that location information of the second device 200 is changed, the second SCI related to retransmission may include the location information related to initial transmission of the first device 100.

For example, based on that location information of the second device 200 is changed, at least one of the location of the second device 200 related to initial transmission or the location of the second device 200 related to retransmission may be used to calculate the distance between the first device 100 and the second device 200.

For example, an HARQ feedback method not based on the distance between the first device 100 and the second device 200 may be configured based on that location information of the first device 100 is not available. For example, the HARQ feedback method may be a method of HARQ NACK-only feedback. For example, the HARQ feedback method may be a method of ACK or NACK feedback. For example, at least one of group size information may be received, and the number of PSFCH candidate resources in a resource pool related to the HARQ feedback may be greater than or equal to the group size.

For example, the MAC PDU may be blindly retransmitted.

For example, TDD-configuration information on a PSBCH based on a pre-configured rule may be determined based on that a time duplex division (TDD) UL-DL configuration is not configured.

The above-described embodiment can be applied to various the device(s) described below. For example, the processor 202 of the second device 200 may control the transceiver 206 to receive first sidelink control information (SCI) related to initial transmission from the first device 100 through a first physical sidelink control channel (PSCCH). In addition, for example, the processor 202 of the second device 200 may control the transceiver 206 to receive second SCI related to initial transmission and a medium access control (MAC) protocol data unit (PDU) from the first device 100 through the first PSSCH. In addition, for example, the processor 202 of the second device 200 may control the transceiver 206 to receive first SCI related to retransmission from the first device 100 through a second PSCCH. In addition, for example, the processor 202 of the second device 200 may control the transceiver 206 to receive second SCI related to retransmission and the MAC PDU from the first device 100 through the second PSSCH.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, first sidelink control information (SCI) related to initial transmission through a first physical sidelink control channel (PSCCH), wherein the first SCI related to the initial transmission includes scheduling information of second SCI related to the initial transmission transmitted through a first physical sidelink shared channel (PSSCH) related to the first PSCCH; receive, from the first device, the second SCI related to the initial transmission and a medium access control (MAC) protocol data unit (PDU) through the first PSSCH, wherein the second SCI related to the initial transmission includes location information related to the initial transmission of the first device; receive, from the first device, first SCI related to retransmission through a second PSCCH, wherein the first SCI related to the retransmission includes scheduling information of second SCI related to the retransmission transmitted through a second PSSCH related to the second PSCCH; and receive, from the first device, the second SCI related to the retransmission and the MAC PDU through the second PSSCH, wherein the second SCI related to the retransmission includes the location information related to the initial transmission of the first device.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
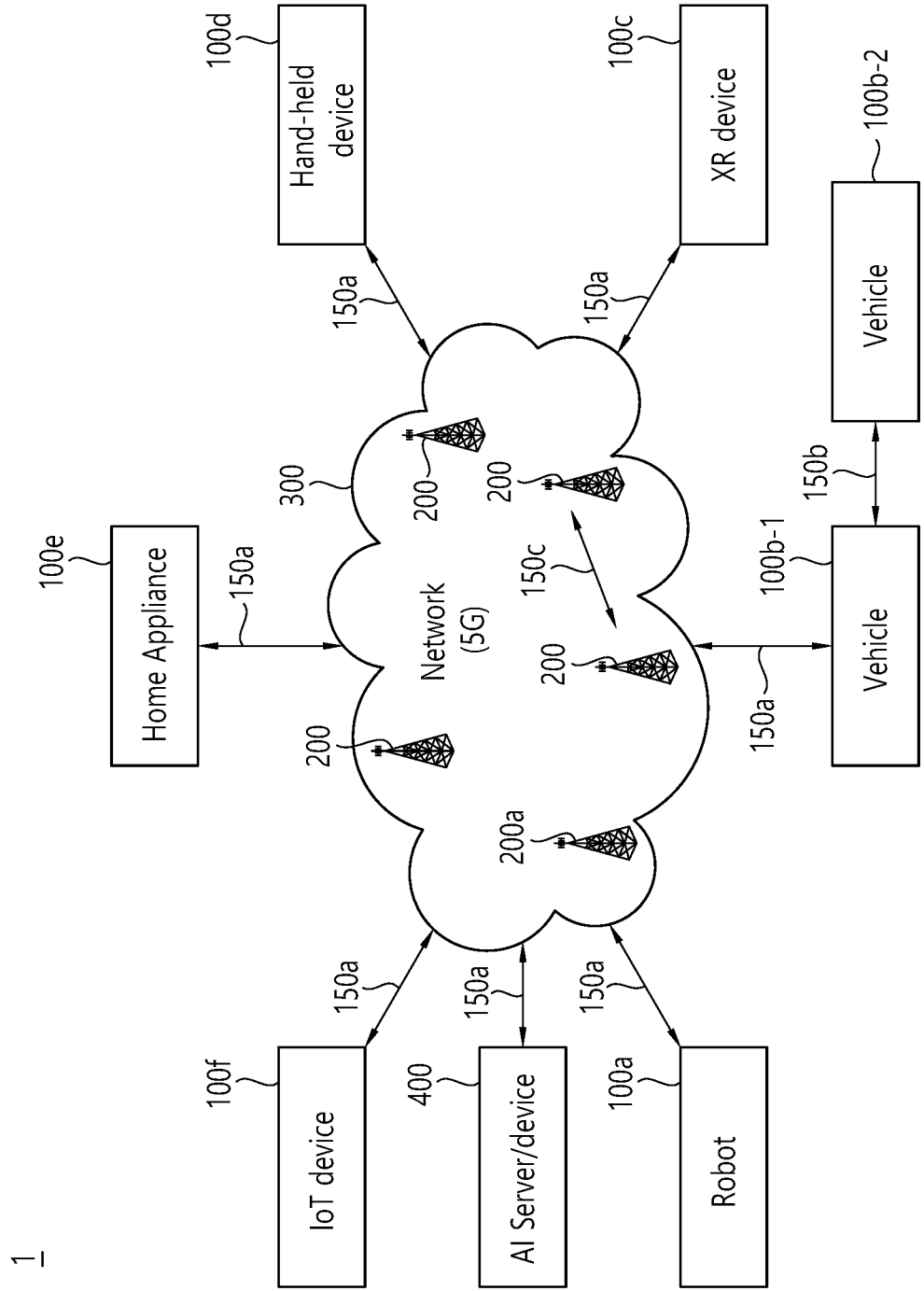
FIG. 16 shows a communication system 1, based on an embodiment of the present disclosure.

FIG. 16 shows a communication system 1, based on an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
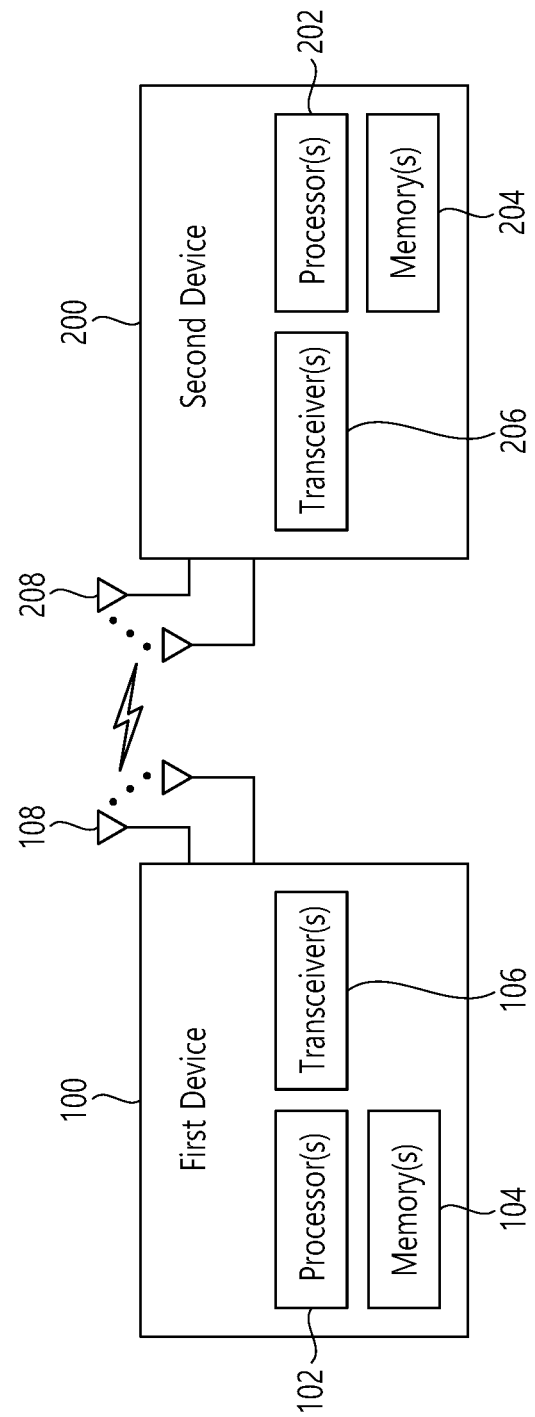
FIG. 17 shows wireless devices, based on an embodiment of the present disclosure.

FIG. 17 shows wireless devices, based on an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
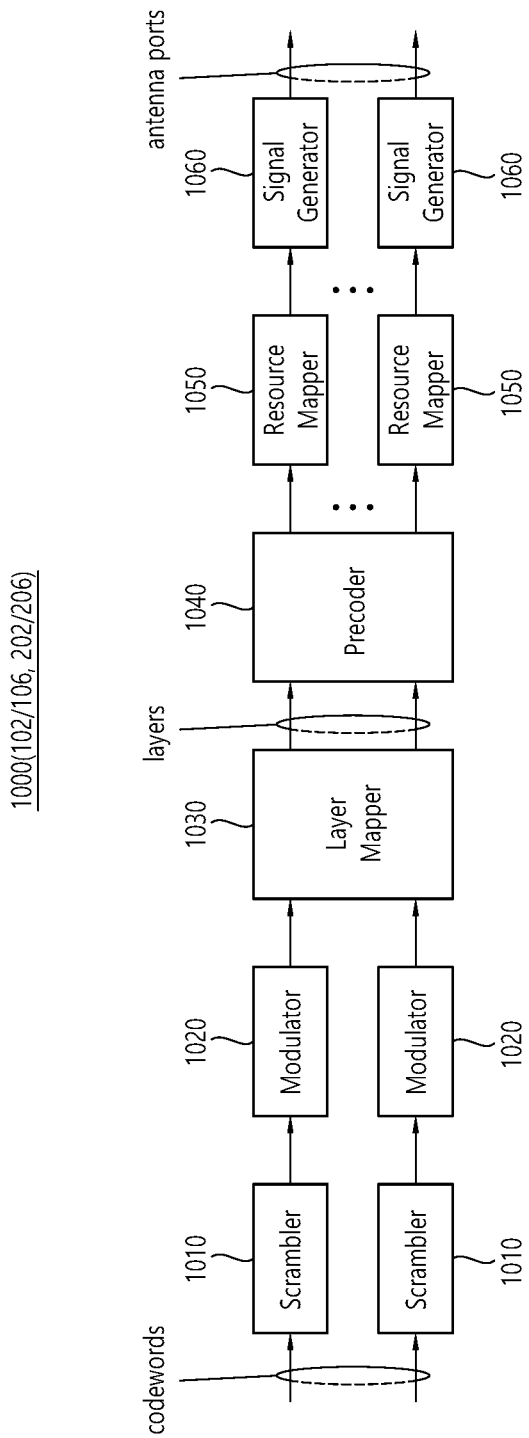
FIG. 18 shows a signal process circuit for a transmission signal, based on an embodiment of the present disclosure.

FIG. 18 shows a signal process circuit for a transmission signal, based on an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
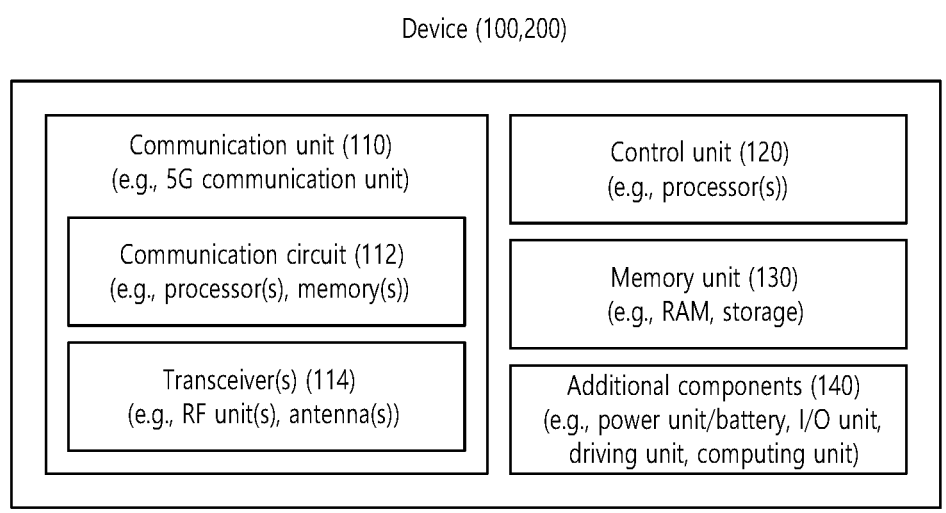
FIG. 19 shows another example of a wireless device, based on an embodiment of the present disclosure.

FIG. 19 shows another example of a wireless device, based on an embodiment of the present disclosure. The wireless device may be implemented in various forms according to a use-case/service (refer to FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
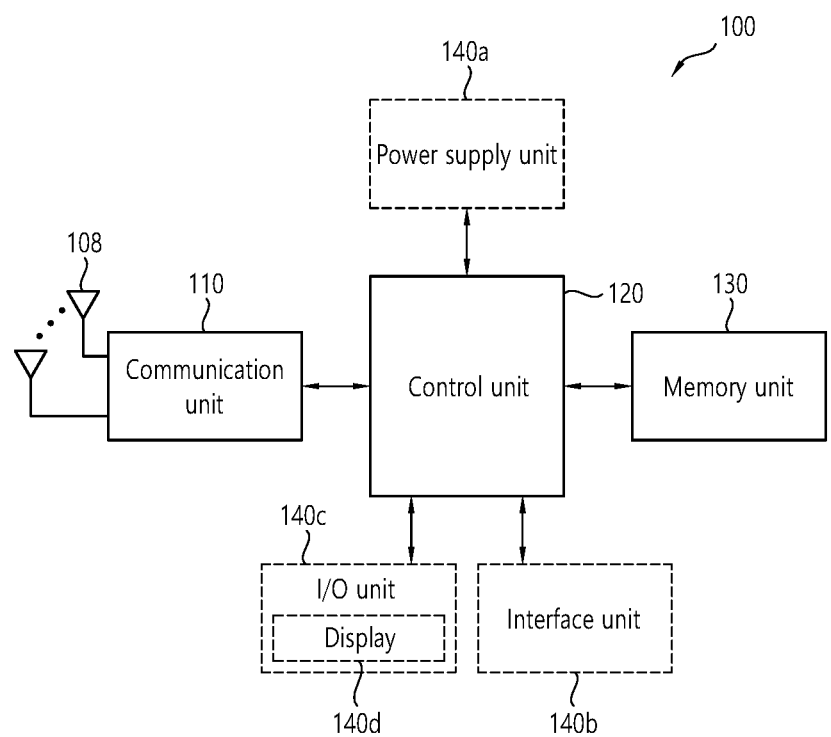
FIG. 20 shows a hand-held device, based on an embodiment of the present disclosure.

FIG. 20 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 19, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
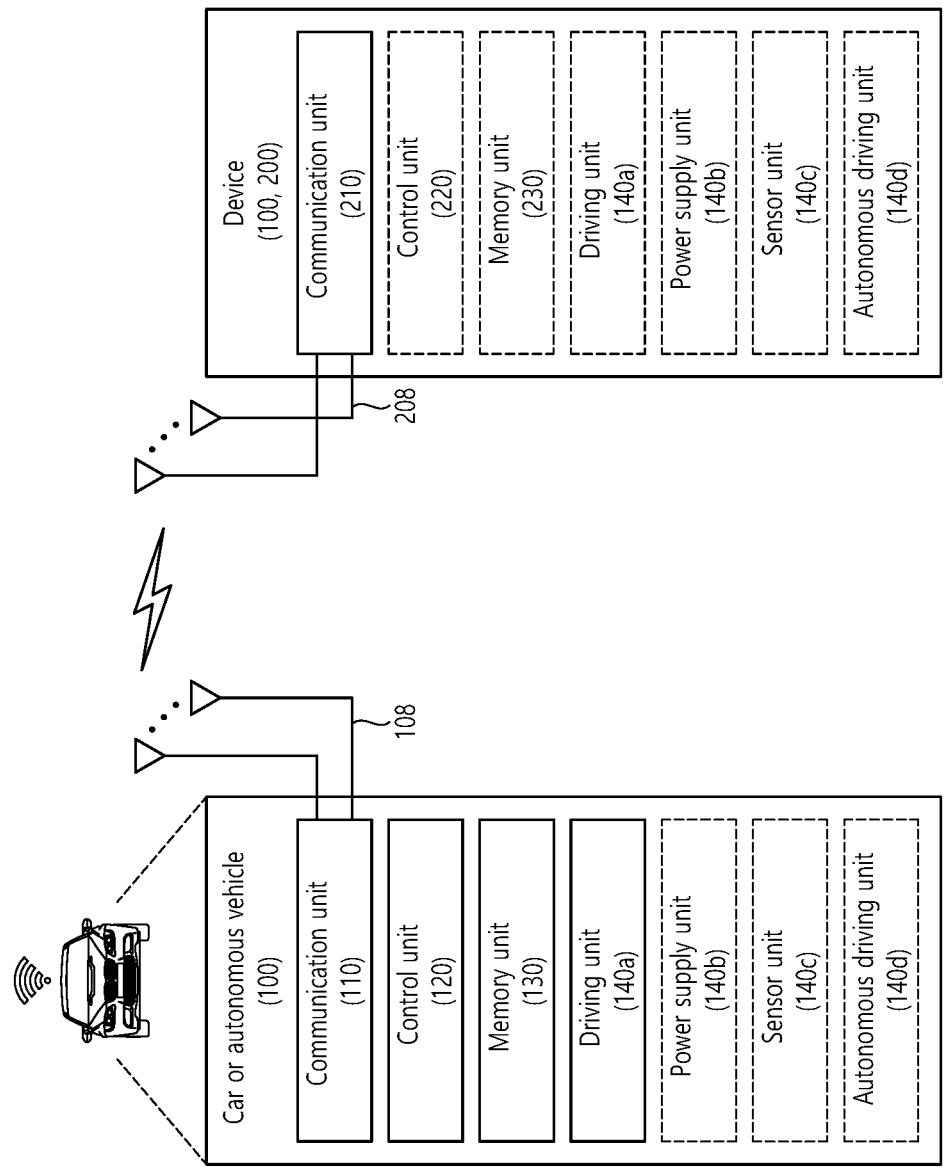
FIG. 21 shows a vehicle or an autonomous vehicle, based on an embodiment of the present disclosure.

FIG. 21 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 21, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    transmitting, to a second device, first sidelink control information (SCI) related to initial transmission through a first physical sidelink control channel (PSCCH),
    wherein the first SCI related to the initial transmission includes scheduling information of second SCI related to the initial transmission transmitted through a first physical sidelink shared channel (PSSCH) related to the first PSCCH;
    transmitting, to the second device, the second SCI related to the initial transmission and a medium access control (MAC) protocol data unit (PDU) through the first PSSCH,
    wherein the second SCI related to the initial transmission includes location information related to the initial transmission of the first device;
    transmitting, to the second device, first SCI related to retransmission through a second PSCCH,
    wherein the first SCI related to the retransmission includes scheduling information of second SCI related to the retransmission transmitted through a second PSSCH related to the second PSCCH; and
    transmitting, to the second device, the second SCI related to the retransmission and the MAC PDU through the second PSSCH,
    wherein the second SCI related to the retransmission includes the location information related to the initial transmission of the first device.

2. The method of claim 1, wherein, based on that the first device receives hybrid automatic repeat request (HARQ) negative acknowledgment (NACK) from the second device, the MAC PDU is retransmitted.

3. The method of claim 1, wherein a method of HARQ NACK-only feedback is enabled.

4. The method of claim 3, wherein the method of HARQ NACK-only feedback is based on a distance between the first device and the second device.

5. The method of claim 4, wherein the distance between the first device and the second device is calculated based on the location information related to the initial transmission of the first device.

6. The method of claim 1, wherein, based on that location information of the second device is changed, the second SCI related to the retransmission includes the location information related to the initial transmission of the first device.

7. The method of claim 1, wherein, based on that location information of the second device is changed, at least one of a location related to the initial transmission of the second device or a location related to the retransmission of the second device is used to calculate a distance between the first device and the second device.

8. The method of claim 1, wherein, based on that location information of the first device is unavailable, an HARQ feedback method not based on a distance between the first device and the second device is configured.

9. The method of claim 8, wherein the HARQ feedback method is a method of NACK-only feedback.

10. The method of claim 8, wherein the HARQ feedback method is a method of acknowledgment (ACK) or NACK feedback.

11. The method of claim 10, at least one of information regarding a group size is received, and
    wherein a number of PSFCH candidate resources in a resource pool related to HARQ feedback is greater than or equal to the group size.

12. The method of claim 1, wherein the MAC PDU is blindly retransmitted.

13. The method of claim 1, wherein, based on that a time duplex division (TDD) uplink-downlink (UL-DL) configuration is not configured, TDD-configuration information in a physical sidelink broadcast channel (PSBCH) based on a pre-configured rule is determined.

14. A first device adapted to perform wireless communication, the first device comprising:
    one or more memories storing instructions;
    one or more transceivers; and
    one or more processors connected to the one or more memories and the one or more transceivers, wherein the one or more processors execute the instructions to:
    transmit, to a second device, first sidelink control information (SCI) related to initial transmission through a first physical sidelink control channel (PSCCH),
    wherein the first SCI related to the initial transmission includes scheduling information of second SCI related to the initial transmission transmitted through a first physical sidelink shared channel (PSSCH) related to the first PSCCH;
    transmit, to the second device, the second SCI related to the initial transmission and a medium access control (MAC) protocol data unit (PDU) through the first PSSCH,
    wherein the second SCI related to the initial transmission includes location information related to the initial transmission of the first device;
    transmit, to the second device, first SCI related to retransmission through a second PSCCH,
    wherein the first SCI related to the retransmission includes scheduling information of second SCI related to the retransmission transmitted through a second PSSCH related to the second PSCCH; and
    transmit, to the second device, the second SCI related to the retransmission and the MAC PDU through the second PSSCH, wherein the second SCI related to the retransmission includes the location information related to the initial transmission of the first device.

15. The first device of claim 14, wherein, based on that the first device receives hybrid automatic repeat request (HARQ) negative acknowledgment (NACK) from the second device, the MAC PDU is retransmitted.

16. The first device of claim 14, wherein a method of HARQ NACK-only feedback is enabled.

17. The first device of claim 16, wherein the method of HARQ NACK-only feedback is based on a distance between the first device and the second device.

18. The first device of claim 17, wherein the distance between the first device and the second device is calculated based on the location information related to the initial transmission of the first device.

19. The first device of claim 14, wherein, based on that location information of the second device is changed, the second SCI related to the retransmission includes the location information related to the initial transmission of the first device.

20. A processing device adapted to control a first device, the processing device comprising:
- one or more processors; and
- one or more memories operably connected to the one or more processors and storing instructions, wherein the one or more processors execute the instructions to:
  - transmit, to a second device, first sidelink control information (SCI) related to initial transmission through a first physical sidelink control channel (PSCCH),
  - wherein the first SCI related to the initial transmission includes scheduling information of second SCI related to the initial transmission transmitted through a first physical sidelink shared channel (PSSCH) related to the first PSCCH;
  - transmit, to the second device, the second SCI related to the initial transmission and a medium access control (MAC) protocol data unit (PDU) through the first PSSCH,
  - wherein the second SCI related to the initial transmission includes location information related to the initial transmission of the first device;
  - transmit, to the second device, first SCI related to retransmission through a second PSCCH,
  - wherein the first SCI related to the retransmission includes scheduling information of second SCI related to the retransmission transmitted through a second PSSCH related to the second PSCCH; and
  - transmit, to the second device, the second SCI related to the retransmission and the MAC PDU through the second PSSCH,
  - wherein the second SCI related to the retransmission includes the location information related to the initial transmission of the first device.

* * * * *